United States Patent [19]
Yoshida et al.

[11] Patent Number: 5,396,610
[45] Date of Patent: Mar. 7, 1995

[54] REGISTER ADDRESS SPECIFYING CIRCUIT FOR SIMULTANEOUSLY ACCESSING TWO REGISTERS

[75] Inventors: Toyohiko Yoshida; Yukari Takata, both of Itami, Japan

[73] Assignee: Mitsubishi Denki Kabushiki Kaisha, Tokyo, Japan

[21] Appl. No.: 752,129

[22] Filed: Aug. 29, 1991

[30] Foreign Application Priority Data

Aug. 29, 1990 [JP] Japan .................................. 2-231967

[51] Int. Cl.⁶ .............................................. G06F 12/02
[52] U.S. Cl. ...................................... 395/425; 364/247; 364/939.81; 364/259.5; 364/255.1; 364/DIG. 1
[58] Field of Search ........................ 395/375, 400, 425

[56] References Cited

U.S. PATENT DOCUMENTS

| | | | |
|---|---|---|---|
| 4,348,741 | 9/1982 | McAlister et al. | 364/900 |
| 4,709,324 | 11/1987 | Klokev | 395/725 |
| 4,747,081 | 5/1988 | Heilveil | 365/219 |
| 4,884,196 | 11/1989 | Theil | 395/425 |
| 4,926,312 | 5/1990 | Nukiyama | 395/375 |
| 5,167,026 | 11/1992 | Murray | 395/375 |
| 5,179,676 | 1/1993 | Kashima | 395/400 |

*Primary Examiner*—Eric Coleman
*Attorney, Agent, or Firm*—Townsend and Townsend Khourie and Crew

[57] ABSTRACT

A register address specifying circuit capable of, besides accessing a register whose address is specified address, accessing also a register whose register address which is one address different from the specified register address, when executing the instruction for transferring a plurality of register contents, and a data processor which is able to access and transfer two register contents at the same time by comprising the same.

7 Claims, 25 Drawing Sheets

Fig. 2

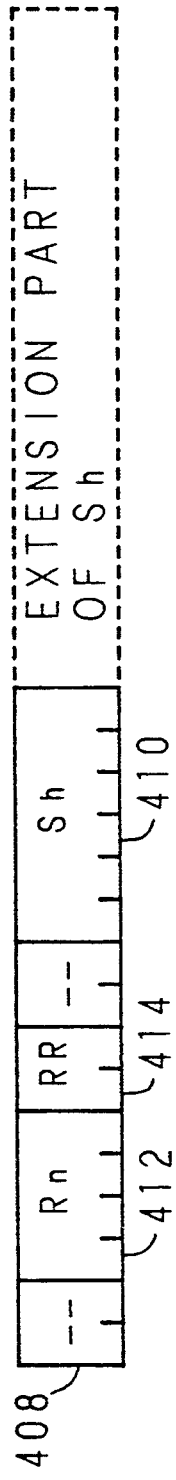
Fig. 3
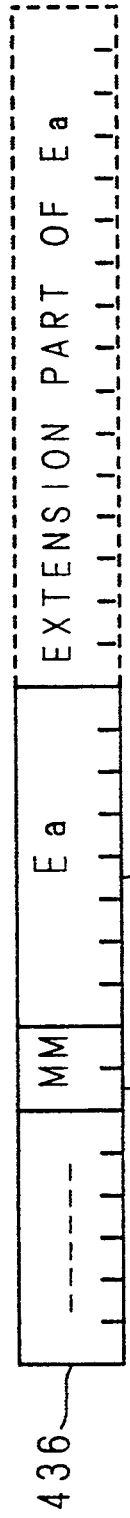
Fig. 4
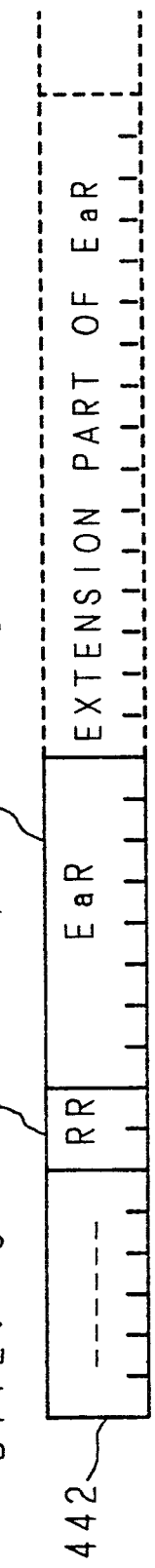
Fig. 5
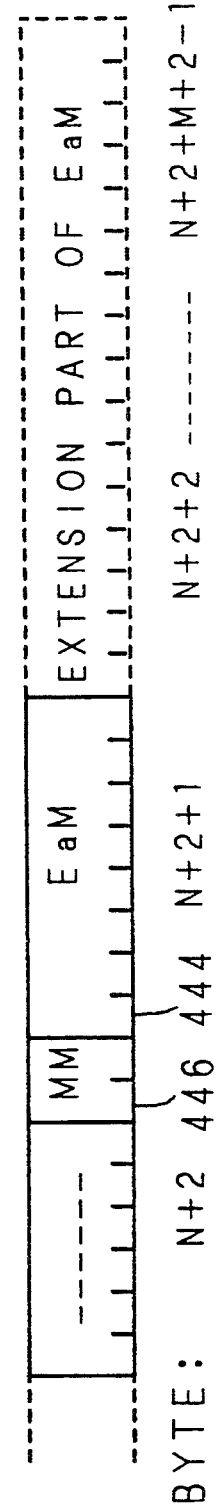

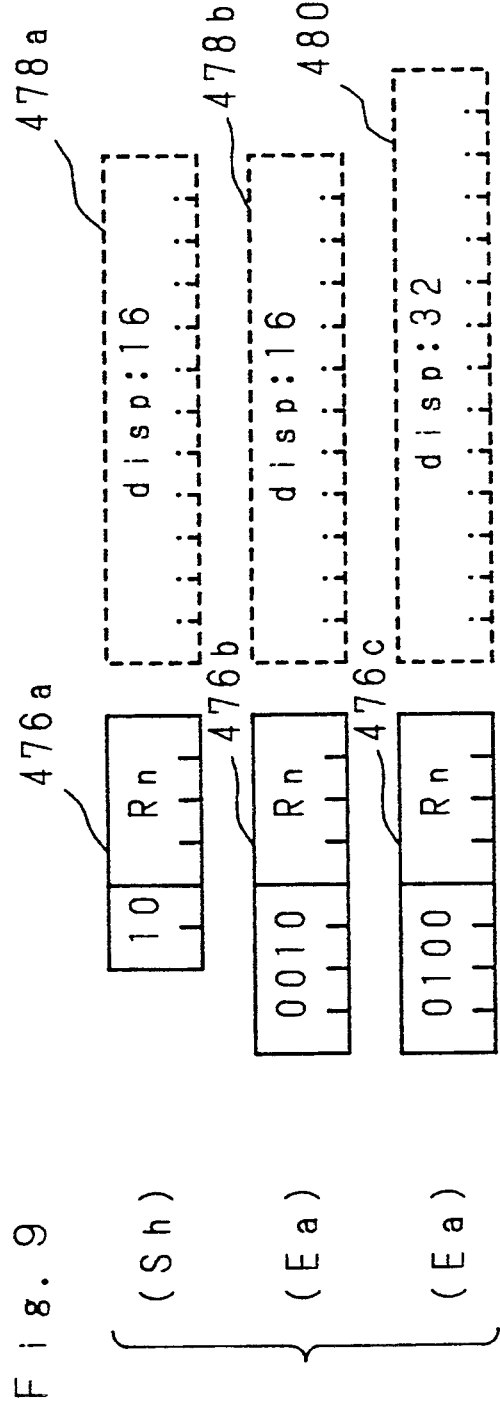

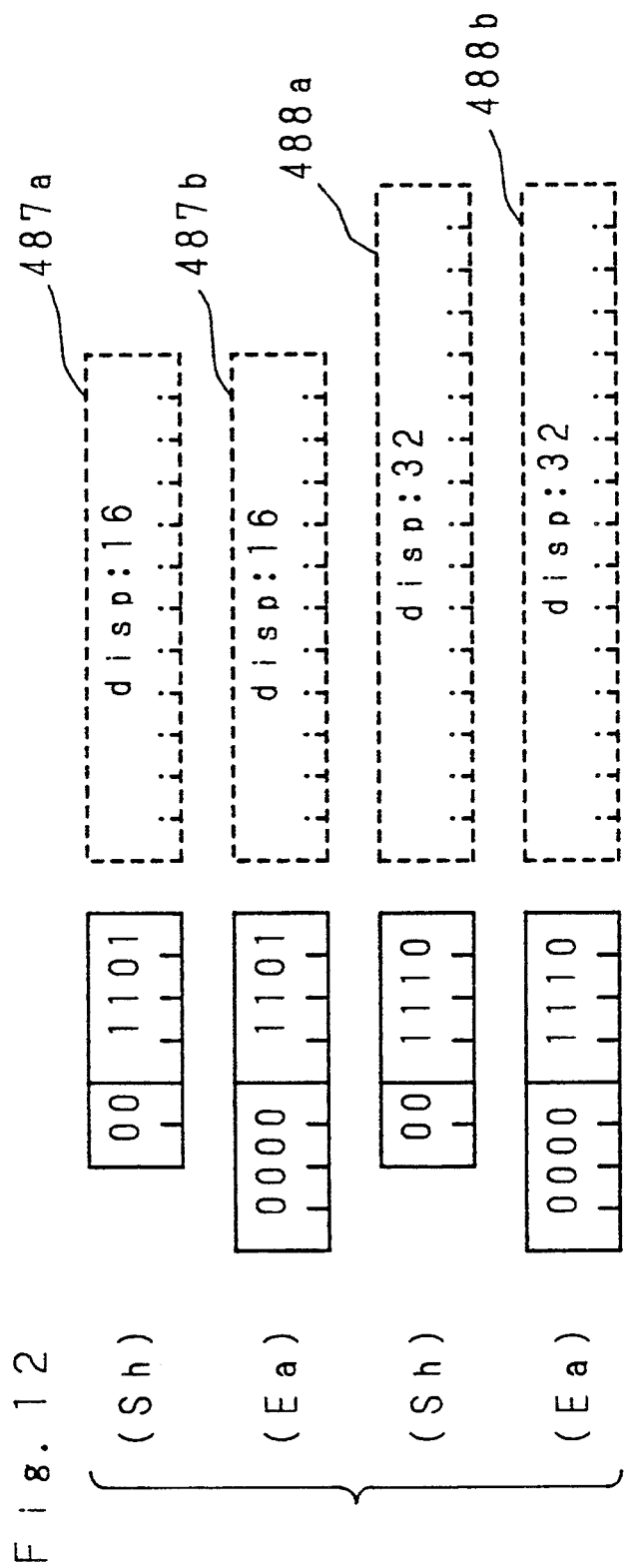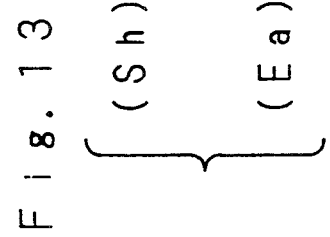

(Ea) `0110 | Rn` — CHAINED ADDRESSING MODE
494   496

Fig. 16

(Sh) `00 1111` — CHAINED ADDRESSING MODE --- CHAINED ADDRESSING MODE
(Ea) `0000 1111` — CHAINED ADDRESSING MODE --- CHAINED ADDRESSING MODE
} 498

Fig. 29

| INSTRUCTION | LDM @SP+, (R1,R4,R5,R6,R7,R8) |
|---|---|
| REGISTER LIST | 0100 1111 1000 0000 |
| SP INITIAL VALUE | H'00001000 |

Fig. 31

| INSTRUCTION | STM (R1,R4,R5,R6,R7,R8), @-SP |
|---|---|
| REGISTER LIST | 0000 0001 1111 0010 |
| SP INITIAL VALUE | H'00002000 |

Fig. 30(a)

```
    START
```

301 STACK POINTER VALUE TRANSFERRED FROM OPERAND ADDRESS CALCULATION UNIT 115 IS TRANSFERRED TO AA REGISTER 211 FROM SA REGISTER 210 VIA. S1 BUS 221.
THE VALUE "H'00001000" IS TRANSFERRED TO OPERAND ACCESS UNIT 120 VIA. AA BUS 122. BUILT-IN DATA CACHE OR EXTERNAL MEMORY IS ACCESSED BY JUDGING THAT LEAST SIGNIFICANT THREE BITS OF ADDRESS ARE "0", SO 8-BYTE DATA IS READ OUT TO DD REGISTER 216.

302 NEXT, REGISTER LIST "01001111 10000000 00000000 00000000" SEQUENTIALLY TRANSFERRED FROM OPERAND ADDRESS CALCULATION UNIT 115 IS TRANSFERRED TO BIT STRING GENERATING CIRCUIT 1 IN PRIORITY ENCODER UNIT 214 VIA. S1 BUS 221 FROM SA REGISTER 210.
AT THIS TIME, OFFSET VALUE SPECIFYING CIRCUIT 2 IS CLEARED AT "0".

303 INPUTTED BIT STRING "01001111 10000000 00000000 00000000" IS TRANSFERRED TO 1st ENCODE CIRCUIT 3. FIRST "1" IS SEARCHED FROM OFFSET 0 AND RESULT "1" IS OUTPUTTED TO ENCODED RESULT JUDGING CIRCUIT 7.
AT SAME TIME, LOGICAL PRODUCT OPERATION OF ADJACENT TWO BITS OF INPUTTED BIT STRING IS EXECUTED BY BIT STRING GENERATING CIRCUIT 1. BIT STRING AS RESULT "00001111 00000000 00000000 00000000" IS TRANSFERRED TO 2nd ENCODE CIRCUIT 4. FIRST "1" IS SEARCHED FROM OFFSET 0 AND RESULT "4" IS OUTPUTTED TO ENCODED RESULT JUDGING CIRCUIT 7.
IN ENCODED RESULT JUDGING CIRCUIT 4, IT IS JUDGED THAT VALUE "1" INPUTTED FROM 1st ENCODE CIRCUIT 3 AND VALUE "4" INPUTTED FROM 2nd ENCODE CIRCUIT 4 IS NOT COINCIDED, SO REGISTER NUMBER "1" IS OUTPUTTED, PARALLEL ACCESS SIGNAL IS NEGATED, ENCODED RESULT "1" AND ADDED VALUE "1" ARE OUTPUTTED TO OFFSET VALUE SPECIFYING CIRCUIT 2.

304 — REGISTER NUMBER "1" IS DECODED BY REGISTER ADDRESS SPECIFYING CIRCUIT 218, AND LEAST SIGNIFICANT FOUR BYTES OF DD REGISTER 216 ARE TRANSFERRED TO REGISTER R1 VIA. S1 BUS 221, MAIN ALU 215 AND D1 BUS 225.

↓

305 — VALUE OF AA REGISTER 211 IS INCREMENTED BY 4, THE VALUE "H'00001004" IS TRANSFERRED TO OPERAND ACCESS UNIT 120 VIA. AA BUS 122, BUILT-IN CACHE OR EXTERNAL MEMORY IS ACCESSED WITH JUDGING THAT LEAST SIGNIFICANT THREE BITS OF ADDRESS IS NOT ZERO, AND 4-BYTE DATA IS READ OUT TO DD REGISTER 216.

↓

306 — NEXT, "1" IS SEARCHED IN BIT STRING "01001111 10000000 00000000 00000000" FROM OFFSET 2 BY 1st ENCODE CIRCUIT 3, AND RESULT "4" IS OUTPUTTED TO ENCODED RESULT JUDGING CIRCUIT 7. AT SAME TIME, "1" IS SEARCHED IN BIT STRING "00001111 00000000 00000000 00000000" FROM OFFSET 2 BY 2nd ENCODE CIRCUIT 4, AND RESULT "4" IS OUTPUTTED TO ENCODED RESULT JUDGING CIRCUIT 7.
IN ENCODED RESULT JUDGING CIRCUIT 7, IT IS JUDGED THAT VALUE "4" INPUTTED FROM 1st ENCODE CIRCUIT 3 AND VALUE "4" INPUTTED FROM 2nd ENCODE CIRCUIT 4 IS COINCIDED AND LEAST SIGNIFICANT THREE BITS OF ADDRESS OUTPUTTED FROM AA BUS 122 ARE NOT ZERO, SO REGISTER NUMBER "4" IS OUTPUTTED, PARALLEL ACCESS SIGNAL IS NEGATED, ENCODED RESULT "4" AND ADDEND "1" ARE OUTPUTTED TO OFFSET VALUE SPECIFYING CIRCUIT 2.

↓

307 — REGISTER NUMBER "4" IS DECODED BY REGISTER ADDRESS SPECIFYING CIRCUIT 218, AND LEAST SIGNIFICANT FOUR BYTES OF DD REGISTER 216 ARE TRANSFERRED TO REGISTER R4 VIA. S1 BUS 221, MAIN ALU 215 AND D1 BUS 225.

VALUE OF AA REGISTER 211 IS INCREMENTED BY 4, ─308
THE VALUE "H'00001008" IS TRANSFERRED TO
OPERAND ACCESS UNIT 120 VIA. AA BUS 122,
BUILT-IN CACHE OR EXTERNAL MEMORY IS ACCESSED
WITH JUDGING THAT LEAST SIGNIFICANT THREE
BITS OF ADDRESS IS ZERO, AND 8-BYTE DATA IS
READ OUT TO DD REGISTER 216.

↓

NEXT, "1" IS SEARCHED IN BIT STRING "01001111 ─309
10000000 00000000 00000000" FROM OFFSET 5 BY
1st ENCODE CIRCUIT 3, AND RESULT "5" IS
OUTPUTTED TO ENCODED RESULT JUDGING CIRCUIT 7.
AT SAME TIME, "1" IS SEARCHED IN BIT STRING
"00001111 00000000 00000000 00000000" FROM
OFFSET 5 BY 2nd ENCODE CIRCUIT 4, AND RESULT
"5" IS OUTPUTTED TO ENCODED RESULT JUDGING
CIRCUIT 7.
IN ENCODED RESULT JUDGING CIRCUIT 7, IT IS
JUDGED THAT VALUE "5" INPUTTED FROM 1st
ENCODE CIRCUIT 3 AND VALUE "5" INPUTTED FROM
2nd ENCODE CIRCUIT 4 IS COINCIDED AND LEAST
SIGNIFICANT THREE BITS OF ADDRESS OUTPUTTED
FROM AA BUS 122 ARE ZERO, SO REGISTER NUMBER
"5" IS OUTPUTTED, PARALLEL ACCESS SIGNAL IS
ASSERTED, ENCODED RESULT "5" AND ADDEND "2"
ARE OUTPUTTED TO OFFSET VALUE SPECIFYING
CIRCUIT 2.

↓

REGISTER NUMBER "5" IS DECODED BY REGISTER ─310
ADDRESS SPECIFYING CIRCUIT 218, AND LEAST
SIGNIFICANT FOUR BYTES OF DD REGISTER 216 ARE
TRANSFERRED TO REGISTER R5 VIA. S1 BUS 221,
MAIN ALU 215 AND D1 BUS 225.
AND REGISTER R6 IS ACCESSED BY CONTROL SIGNAL
SHIFTING DECODED RESULT OF REGISTER NUMBER
"5" TO 1 BIT, AND MOST SIGNIFICANT FOUR BYTES
OF DD REGISTER 216 ARE TRANSFERRED TO
REGISTER R6 VIA. S2 BUS 222, AUXILIARY ALU
212 AND D3 BUS 226.

311 — VALUE OF AA REGISTER 211 IS INCREMENTED BY 4, THE VALUE "H'00001010" IS TRANSFERRED TO OPERAND ACCESS UNIT 120 VIA. AA BUS 122, BUILT-IN CACHE OR EXTERNAL MEMORY IS ACCESSED, AND 8-BYTE DATA IS READ OUT TO DD REGISTER 216.

312 — NEXT, "1" IS SEARCHED IN BIT STRING "01001111 10000000 00000000 00000000" FROM OFFSET 7 BY 1st ENCODE CIRCUIT 3, AND RESULT "7" IS OUTPUTTED TO ENCODED RESULT JUDGING CIRCUIT 7. AT SAME TIME, "1" IS SEARCHED IN BIT STRING "00001111 00000000 00000000 00000000" FROM OFFSET 7 BY 2nd ENCODE CIRCUIT 4, AND RESULT "7" IS OUTPUTTED TO ENCODED RESULT JUDGING CIRCUIT 7.
IN ENCODED RESULT JUDGING CIRCUIT 7, IT IS JUDGED THAT VALUE "7" INPUTTED FROM 1st ENCODE CIRCUIT 3 AND VALUE "7" INPUTTED FROM 2nd ENCODE CIRCUIT 4 IS COINCIDED AND LEAST SIGNIFICANT THREE BITS OF ADDRESS OUTPUTTED FROM AA BUS 122 ARE ZERO, SO REGISTER NUMBER "7" IS OUTPUTTED, PARALLEL ACCESS SIGNAL IS ASSERTED, ENCODED RESULT "7" AND ADDEND "2" ARE OUTPUTTED TO OFFSET VALUE SPECIFYING CIRCUIT 2.

313 — REGISTER NUMBER "7" IS DECODED BY REGISTER ADDRESS SPECIFYING CIRCUIT 218, AND LEAST SIGNIFICANT FOUR BYTES OF DD REGISTER 216 ARE TRANSFERRED TO REGISTER R7 VIA. S1 BUS 221, MAIN ALU 215 AND D1 BUS 225.
AND REGISTER R8 IS ACCESSED BY CONTROL SIGNAL SHIFTING DECODED RESULT OF REGISTER NUMBER "7" TO 1 BIT, AND MOST SIGNIFICANT FOUR BYTES OF DD REGISTER 216 ARE TRANSFERRED TO REGISTER R8 VIA. S2 BUS 222, AUXILIARY ALU 212 AND D3 BUS 226.

→ (d)

REGISTER ADDRESS SPECIFYING CIRCUIT FOR SIMULTANEOUSLY ACCESSING TWO REGISTERS

BACKGROUND OF THE INVENTION

1. Field of the Invention

The present invention relates to a register address specifying circuit and a data processor comprising the same. More particularly, it relates to a data processor which accesses two register contents at the same time by comprising the register address specifying circuit capable of, besides accessing a specifying address register, accessing also a register whose address is one address different from the specified register address, when executing the instruction for transferring a plurality of register contents.

2. Description of the Related Art

Conventionally, in a data processor, for the purpose of accessing data used frequently at a high speed with a simple mechanism, a register file comprising about 16 general purpose registers is provided and the data being accessed frequently and the intermediate operation results are held in the register file.

In softwares using such register file, a technique for permuting data in the register file at borders of a series of processings is employed. Accordingly, processing for storing the data from the registers to a memory by several numbers continuously at a time, or processings for loading the data from the memory to the registers by several numbers continuously at a time are repeated frequently.

In high-level languages such as the C or the Pascal, a technique of rearranging frequently used variables into the registers at every procedure is used often. Accordingly, in the softwares designed in these high-level languages, it is often the case that a plurality of data are stored to the memory from the registers, or conversely, a plurality of data are loaded to the registers from the memory.

Therefore, a data processor having a multi-data transfer instruction which stores a plurality of data into the memory from the registers by one instruction, or loads a plurality of data to the registers from the memory by one instruction has been proposed hitherto. In such a multi-data transfer instruction, a technique of indicating the register, to which data is to be transferred, by a register list corresponding to a bit string of "0" and "1" is used. Accordingly, it is necessary to search the register list and encode a register number to be transferred at a high speed, therefore, for this purpose an encoding circuit called a priority encoder is proposed as a hardware.

When executing the multi-data transferring instruction, data were transferred by decoding the register number outputted from the priority encoder and accessing the registers sequentially. Accordingly, even when transferring the register contents of serial register numbers, it is arranged such that the register numbers are decoded one by one, and the register address specifying circuit cannot access the register whose number is next to the inputted number.

In the conventional register address specifying circuit, an inputted register number and the register to be accessed thereby is corresponded with each other at one against one. Therefore, in the case where the register number inputted and the register whose register number adjacent thereto are accessed, the register number being inputted to the register number specifying circuit must be incremented or decremented. Also, such increment or decrement must be carried out by hardwares such as a counter, so that in the case where the inputted register number and the register adjacent thereto must by accessed at the same time, a delay time may be prolonged.

In the conventional data processor, when the plural data transferring instruction is executed, data are transferred by accessing the registers one by one sequentially according to the register number obtained by searching a register list using the priority encoder and encoding the bit position of "1" (or "0") as a binary digit. Accordingly, the transferring operation must be repeated at least the same number of data to be transferred.

SUMMARY OF THE INVENTION

The present invention has been devised in view of the circumstances as aforementioned, therefore, it is a primary object thereof to provide a register address specifying circuit capable of, besides accessing a specified address register, accessing also a register whose address is one address different from the specified register address, when executing the instruction for transferring a plurality of register contents, and a data processor which is able to access and transfer the two register contents at the same time by comprising the same.

The register address specifying circuit of the present invention comprises a decoder for decoding a register address represented by a binary digit into a first bit string, and a selector which inputs the first bit string which is the decoded result of the decoder and a second bit string obtained by shifting the decoded result of the decoder by one bits and outputs either of the bit strings selectively.

In the register address specifying circuit of the present invention thus constructed, responsive to the selective operation of the selector, a register whose address is n is accessed or the register whose address is either the $n+1$ or $n-1$ is accessed.

A first invention of the data processor of the present invention comprises, instruction decoding means for decoding instructions and instruction executing means which includes: a data register holding 2n-bit data; a first register of a first register address holding an n-bit data; a second register of a second register address holding an n-bit data; a first bus for transferring a first n-bit data to the data register from the first register; a second bus for transferring a second n-bit data to the data register from the second register; an address decoder for decoding an address of a register to be connected to the first bus; and a register address specifying circuit for decoding an address of a register to be connected to the second bus; and which executes the instruction according to the output of the instruction decoding means.

In the first invention of the data processor of the present invention thus constructed, in the case where a basic operation instruction (first instruction) is decoded by the instruction decoding means, the register address specifying circuit accesses the second register according to the second register address to transfer an n-bit data to the data register from the second register, and in the case where the multi-data transferring instructions (second instruction) is decoded by the instruction decoding means, since the first register address is decoded by the address decoder and the first register is accessed, the first data is transferred to the data register from the first register, and the register address specifying circuit accesses the second register according to the first register address, so that the second data is transferred to the data register from the second register, and finally, the first and second data are concatenated.

A second invention of the data processor of the present invention comprises, instruction decoding means for decoding instructions and instruction executing means which includes: a data register holding 2n-bit data; a first register of a first register address holding an n-bit data; a second register of a second register address holding an n-bit data, a first bus for transferring a first n-bit data to the first register from the data register; a second bus for transferring a second n-bit data to the second register from the data register; an address decoder for decoding an address of a register to be connected to the first bus; and a register address specifying circuit for decoding an address of a register to be connected to the second bus; and which executes the instruction according to the output of the instruction decoding means.

In the second invention of the data processor of the present invention thus constructed, in the case where a basic operation instruction (first instruction) is decoded by the instruction decoding means, since the register address specifying circuit accesses the second register according to the second register address, an n-bit data is transferred to the second register from the data register, and in the case where a multi-data transferring instruction (second instruction) is decoded by the instruction decoding means, the first register address is decoded by the address decoder and the first register is accessed, so that the first data is transferred to the first register from the data register, and the second data is transferred to the second register from the data register since the second register is accessed by the register address specifying circuit according to the first register address.

The above and further objects and features of the invention will more fully be apparent from the following detailed description with accompanying drawings.

BRIEF DESCRIPTION OF THE DRAWINGS

FIG. 2, FIG. 3, FIG. 4, FIG. 5, and FIG. 6 are schematic views showing instruction formats of a data processor of the present invention, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, and FIG. 20 are schematic views showing formats of an addressing mode specifying field in the instruction of the present invention, FIG. 29 is a schematic view showing an example code of the LDM instruction as a multi-data loading instruction, FIGS. 30a, 30b, 30c, 30d and 30e are a flow chart showing an algorithm of the operation by the data processor of the present invention at executing of the example of the instruction as shown in FIG. 29, FIG. 31 is a schematic view showing an example code of the STM instruction as a multi-data storing instruction.

DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
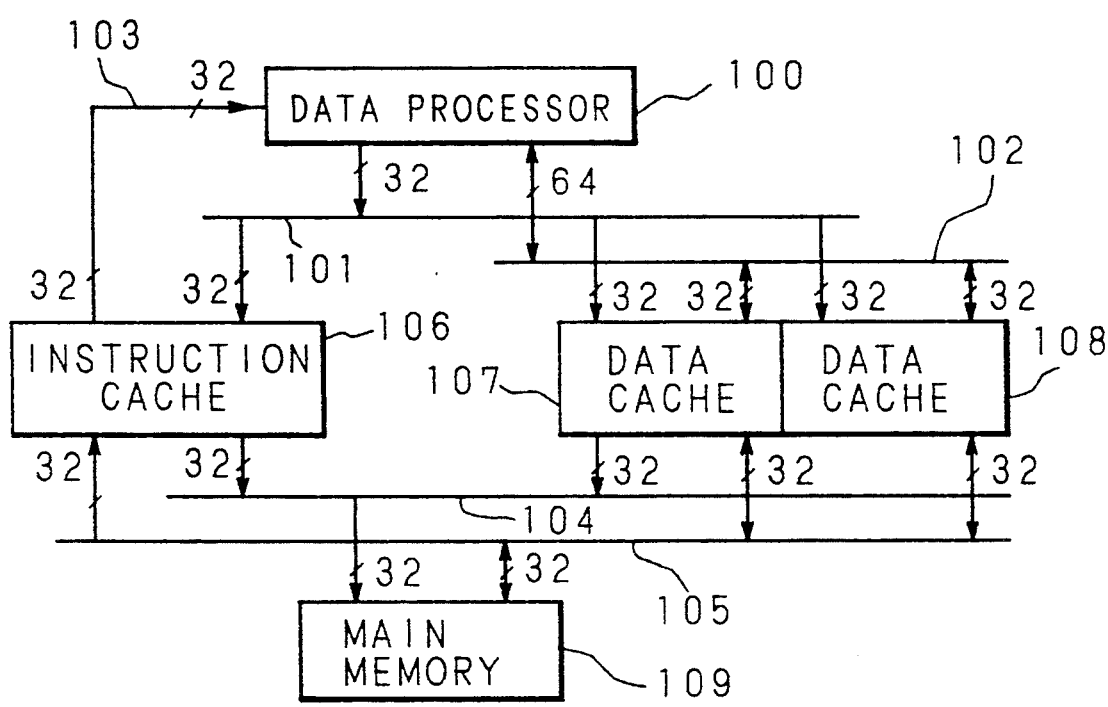
FIG. 1 is a block diagram showing an exemplary configuration of a data processing system using a data processor of the present invention.

FIG. 1 shows a configuration of a system using a data processor of the present invention.

In this configuration, a data processor 100 of the present invention, an instruction cache 106, data caches 107 and 108, and a main memory 109 are connected by an address bus 101, a data bus 102, an instruction bus 103, a memory address bus 104, and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 or the data caches 107, 108 misses, the caches 106 and 107 arbitrate the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, instructions and a processing mechanism of the data processor 100 of the present invention will be explained, and next, operations of priority encodes and a data operation unit will be explained in detail when LDM and STM instructions which are instructions for transferring data in a plurality of registers.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format specifically devised for the purpose of highly frequent instructions in a short format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

The meanings of symbols appearing in the instruction format of the data processor of the present invention shown in FIG. 2 to FIG. 6 are as follows:
—: Field wherein operation code is put.
Ea: Field for generating an operand in a general type 8-bit addressing mode.
Sh: Field for specifying an operand in a short type 6-bit addressing mode.
Rn: Field for specifying an operand in a register by the register number.

Figure 2:
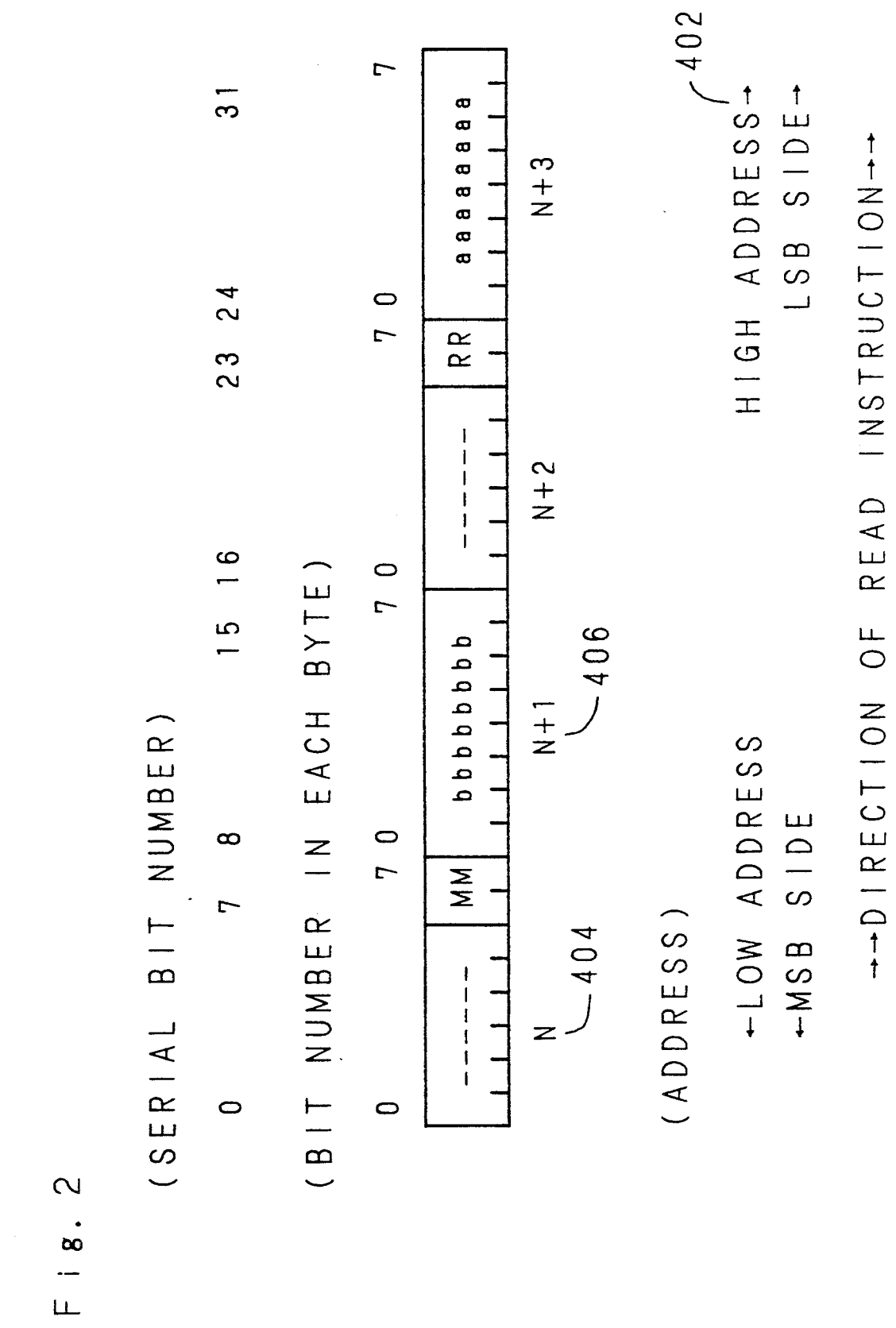

In the format, as shown in FIG. 2, the right side 402 is the LSB side and is higher address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

FIG. 3 is a schematic diagram showing short format of the two-operand instruction.

This format includes a L-format wherein the source operand side is memory and a S-format wherein the destination operand side is memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the overflow portion and overflow check are performed.

(2.2) "General-Format One-Operand Instruction"

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
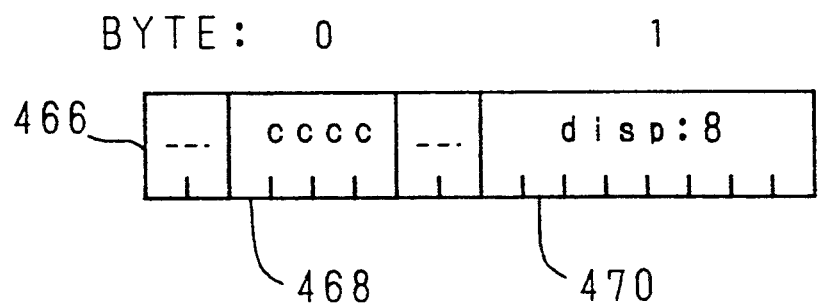

FIG. 6 is a schematic diagram showing a format 466 of a short branch instruction.

Symbol cccc 468 represents the specifying field of a branch condition, symbol disp:8 470 represents the specifying field of displacement to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 17 is as follows:
Rn: Register specifying field
(Sh): Designating method by the short-type addressing mode of six bits
(Ea): Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
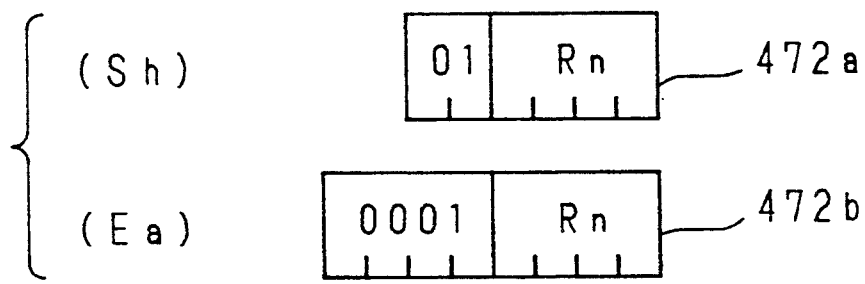

The register direct mode takes the content of a register intact as an operand. FIG. 7 is a schematic diagram of the format thereof. Each symbol Rn 472a, 472b shows the number of the general-purpose register.

Figure 8:
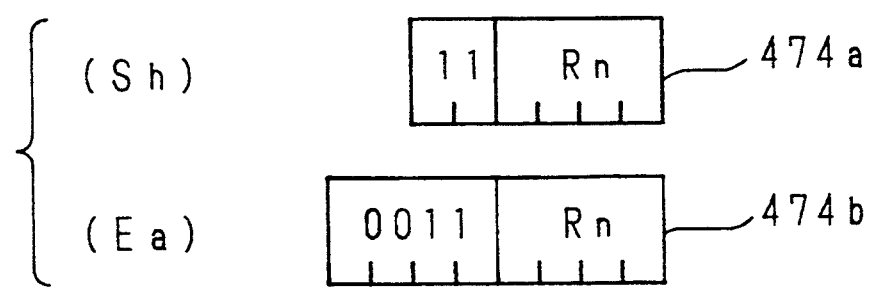

The register indirect mode takes as an operand the content of the memory whose address is the content of a register. FIG. 8 is a schematic diagram of the format thereof. Each symbol Rn 474a, 474b shows the number of the general-purpose register.

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp:16 478a, 478b and disp:32 480 shows the displacement value of 16 bits and the displacement value of 32 bits, respectively. The displacement value is handled with a signed binary number.

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
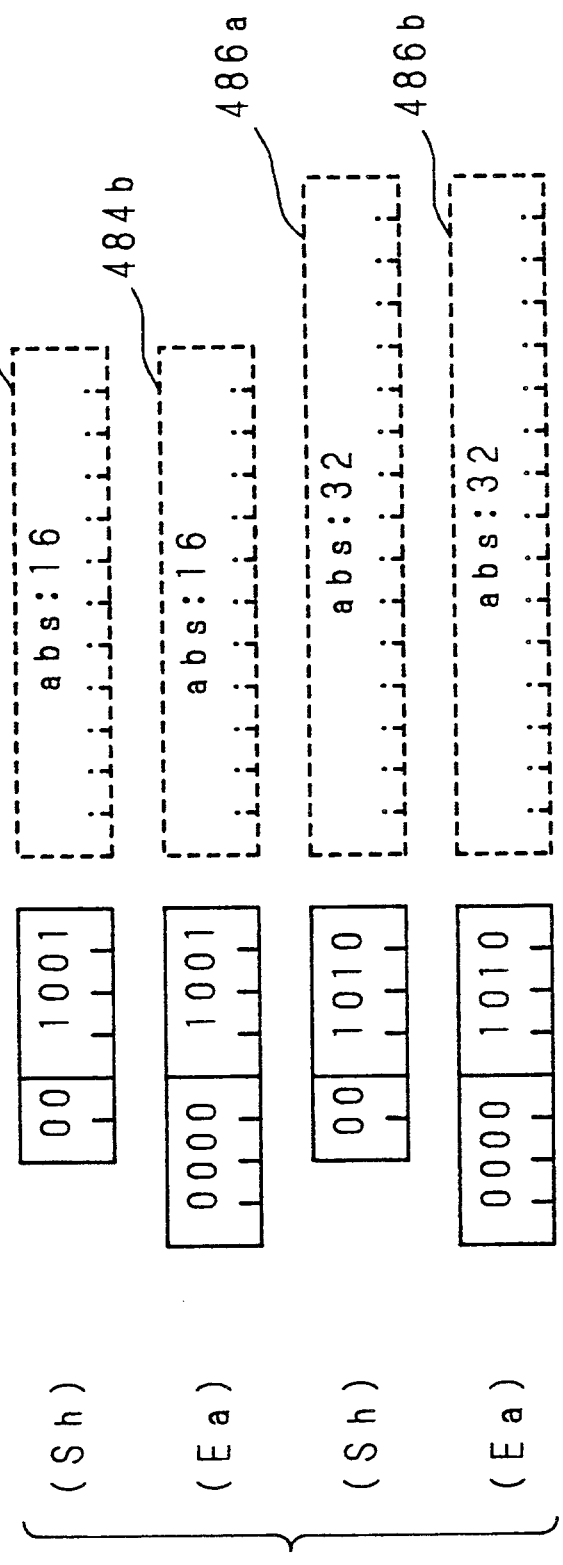

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs:16 484a, 484b and abs:32 486a shows the address value of 16 bits and 32 bits, respectively. When the address is shown by abs:16, the specified address value is sign-extended to 32 bits.

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp:16 486a, 486b and disp:32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits, 16 bits and 64 bits can also be performed, and the SP is renewed (incremented) by +1, +2 and +8, respectively. FIG. 13 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

The register base chained addressing mode is an addressing mode taking the value of register as the base value of the chained addressing to be extended. FIG. 15 is a schematic diagram showing the format 494 thereof. Symbol Rn 496 shows the number of the general-purpose register.

The PC base chained addressing mode is an addressing mode taking the value of the program counter (PC) as the base value of the chained addressing to be extended. FIG. 16 is a schematic diagram showing the format 498 thereof.

Figure 17:
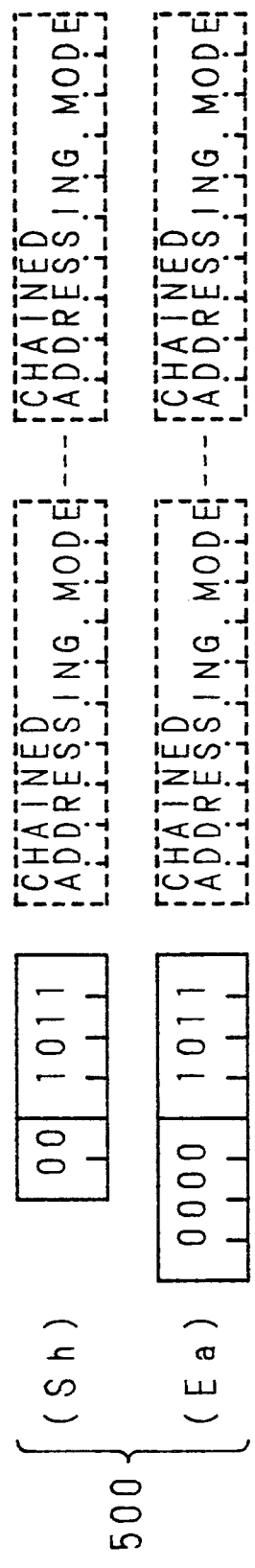

The absolute base chained addressing mode is an addressing mode taking zero as the base value of the chained addressing to be extended. FIG. 17 is a schematic diagram of the format 500 thereof.

Figure 18:
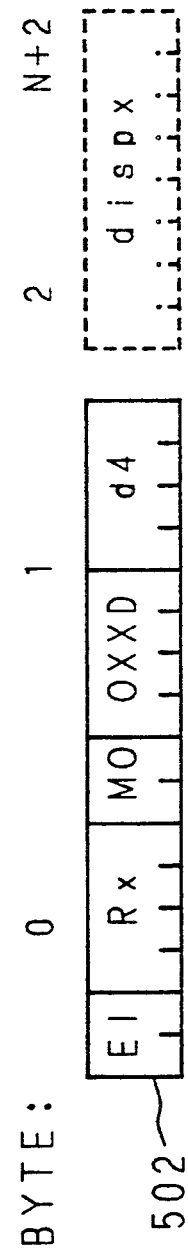

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

E=0: Chained addressing mode is continued.
E=1: Address calculation ends. tmp→address of operand
I=0: No memory indirect reference is performed. tmp+disp+Rx*Scale→tmp
I=1: Memory indirect reference is performed. mem [tmp+disp+Rx*Scale]→tmp
M=0: <Rx> is used as an index.
M=1: Special index
   <Rx>=0 Index value is not added (Rx=0).
   <Rx>=1 Program counter is used as an index value (Rx=PC).
   <Rx>=2 or more Reserved.
D=0: The value of field d4 of four bits in the chained addressing mode is quadrupled to be taken as a displacement value, and this value is added. The d4 is handled with a signed binary number, and is used by surely quadrupling it irrespective of the size of the operand.
D=1: The dispx (16/32 bits) specified in the extension part of the chained addressing mode is taken as a displacement value, the size of the extension part whereto this value is added is specified in the d4 field.
   d4=0001 dispx: 16 bits
   d4=0010 dispx: 32 bits
XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
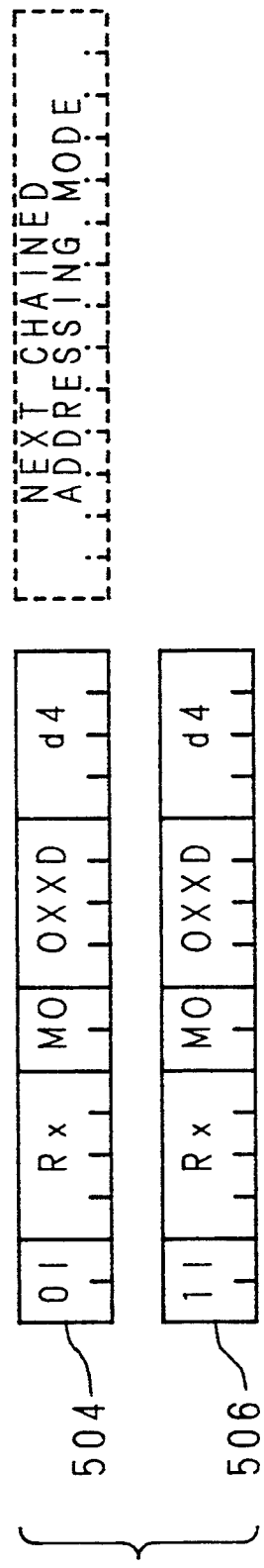
Figure 20:
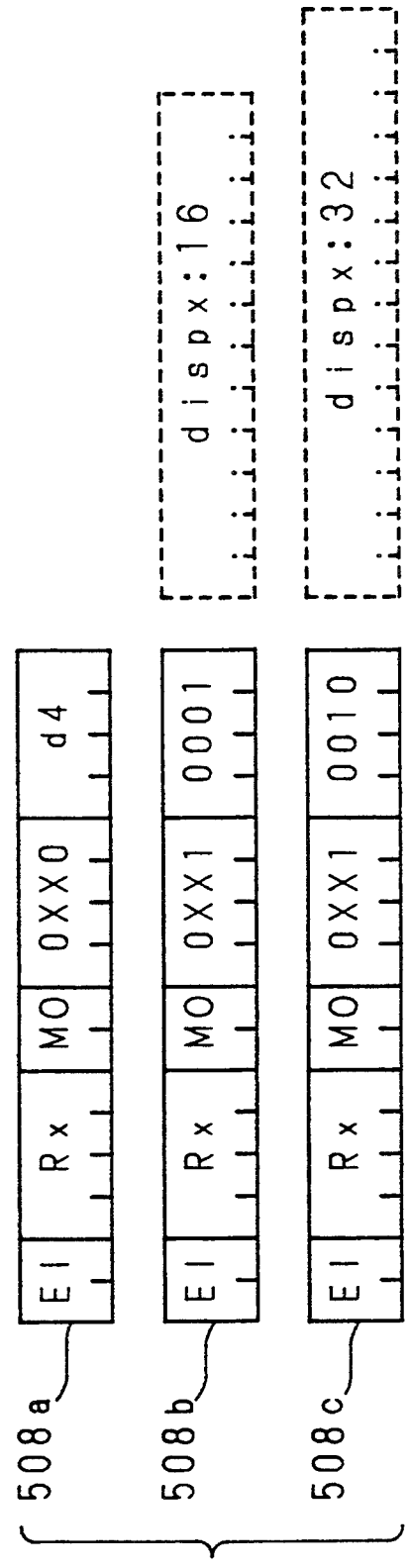

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(2.5) "Saving and Restoring Register Instructions"

A data processor 100 of the present invention comprises STM instruction which stores the contents of a plurality of registers into a memory area such as a stack area, and LDM instruction which loads the contents of a plurality of registers saved into the memory area such as the stack area.

Figure 21:
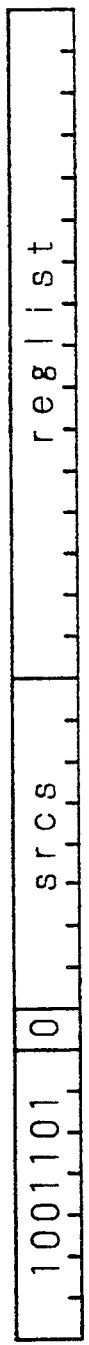
FIG. 21 is a schematic diagram of a format of LDM instruction as a multi-data loading instruction.

A format of the LDM instruction is schematically shown in FIG. 21. In the LDM instruction, data are transferred to registers specified in a reglist filed from an address of the memory calculated in accordance with an addressing mode specified in the srcs field. The registers into which the data are transferred are specified by a bit pattern in the reglist field. Data transferred to each register are respectively four bytes.

Figure 22:
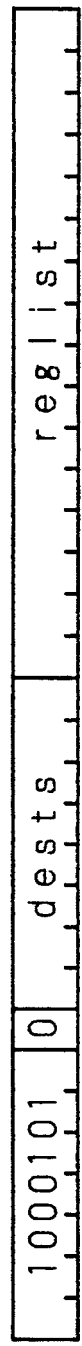
FIG. 22 is a schematic diagram of a format of STM instruction as a multi-data storing instruction.

A format of the STM instruction is shown schematically in FIG. 22. In the STM instruction, data in registers specified in the reglist filed are transferred to an address of the memory calculated in accordance with an addressing mode specified in the dests field. The registers from which the data are transferred are specified by a bit pattern in the reglist field. As shown in FIG. 22, meaning of the reglist field of the STM instruction differs with the addressing modes specified in the dests field. This is because that, when a plurality of register contents are stored in the memory, it is unified to store the register with larger number always in the higher address. The data transferred from each of the registers are respectively four bytes.

(3) "Configuration of Function Block"

Figure 23:
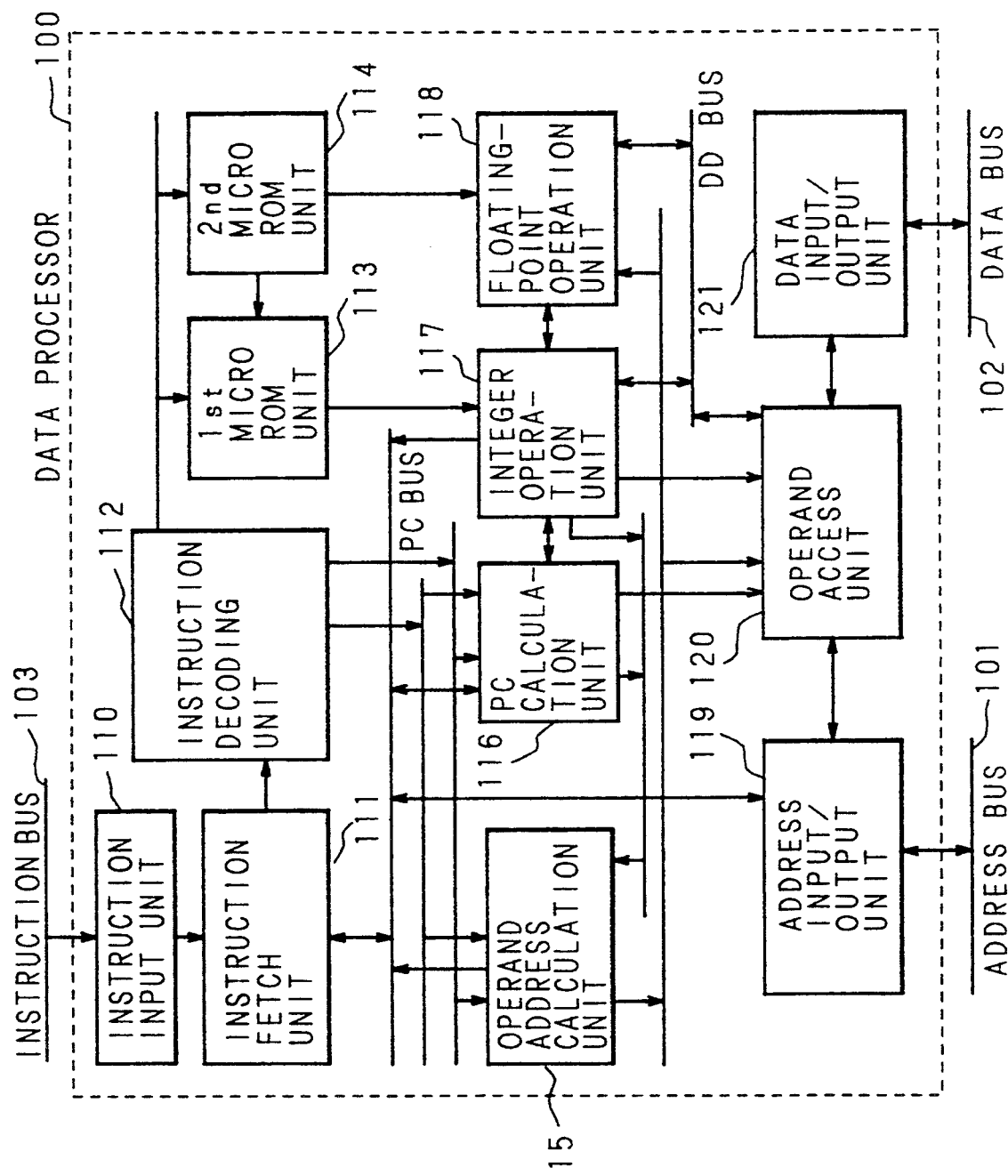
FIG. 23 is a block diagram showing a general configuration of a data processor of the present invention.

FIG. 23 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a floating-point operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(3.1) "Instruction Input Unit"

The instruction input unit 110 inputs instruction codes by 32 bits to the data processor of the present invention from the external instruction bus 103.

There are two access modes to the instruction cache 106. One is a standard access mode wherein a 32-bits instruction code is accessed with respect to one address. Another is a quad access mode wherein four 32-bits instruction codes are continuously accessed by four times with respect to one address. In both cases, the instruction input unit 110 outputs the inputted instruction code to the instruction fetch unit 111.

(3.2) "Instruction Fetch Unit"

The instruction fetch unit 111 which comprises an address translation mechanism for an instruction address, a built-in instruction cache, an instruction TLB, an instruction queue and a controlling unit thereof.

The instruction fetch unit 111 translates the PC value of the instruction to be fetched next, fetches the instruction code from the built-in instruction cache, and outputs it to the instruction decoding unit 112. In the case where the built-in instruction cache misses, the instruction fetch unit 111 outputs the physical address to the address input/output unit 119 to request an instruction access for exterior, so that the instruction code inputted through the instruction input unit 110 is registered to the built-in cache.

The PC value of an instruction to be fetched next is calculated by a dedicated counter as the PC value of the instruction to be inputted to an instruction queue. In the case where a jump is taken, the PC value of a new instruction is transferred from the operand address calculation unit 115, PC calculation unit 116 or the integer operation unit 117.

A control circuit inside the instruction fetch unit 111 also executes address translation and updating of the instruction TLB by paging in the case where the instruction TLB misses.

Also, in the case where the data processor of the present invention is under the bus watch mode, an entry, which is hit by the physical address inputted through the address input/output unit 109, of the built-in instruction cache is made invalid.

(3.3) "Instruction Decoding Unit"

In the instruction decoding unit 122 basically an instruction code is decoded on a 16-bit (half word) basis. This block comprises a FHW (First Half Word) decoder for decoding an operation code included in the first half word, a NFHW (Not First Half Word) decoder for decoding an operation code including in the second and the third half words, and an addressing mode decoder for decoding an addressing mode.

There are also the second stage decoder which further decodes an output of the FHW decoder and the NFHW decoder and generates an entry address of the micro ROM, a branch predicting mechanism for performing branch prediction of a conditional branch instruction, and an address calculation conflict checking mechanism for checking data hazards in calculating an operand address.

The instruction decoding unit 112 decodes the instruction code being inputted from the instruction fetch unit 111 by 0 byte through 6 bytes per one clock. Among the results of decoding, information on operation in the integer operation unit 117 is outputted to the first micro ROM unit 113, information on operation in the floating-point operation unit 118 is outputted to the second micro ROM unit 114, information on operand address calculation is outputted to the operand address calculation unit 115, and information on PC calculation is outputted to the PC calculation unit 116, respectively.

(3.4) "First Micro ROM Unit"

The first micro ROM unit 113 comprises a micro ROM for storing microprograms which mainly controls the integer operation unit 117, a microsequencer, and a microinstruction decoder. A microinstruction is read out from the micro ROM within one clock cycle. The microsequencer accepts processings of exception, interruption, and trap (these three are generally called EIT) in addition to the sequential processings of the microprograms corresponding to each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder is mainly given to the integer operation unit 117, but some information is outputted also to other blocks at execution of jump instruction and acceptance of execution.

(3.5) "Second Micro ROM Unit"

In the second micro ROM unit 114, a micro ROM in which various microprogram routines for controlling a floating-point operation unit 118 are stored, a microsequencer, a microinstruction decoder and so on are included. One microinstruction is read from the micro ROM in one clock cycle. The microsequencer also processes the exception related to the floating-point operation besides the sequence processing specified by the microprogram, and when the unmasked floating point exception is detected, requests the exception processing to the first micro ROM unit 113. The microsequencer of the second micro ROM unit 114 operates in parallel to the microsequencer of the first micro ROM unit 113, and controls the floating-point operation unit 118 in parallel to the integer operation unit 117.

To the second micro ROM unit 114, flag information resulted from the floating-point operation execution is also inputted.

Though output of the microdecoder is mainly outputted to the floating-point operation unit 118, a part of information such as detection of the exception related to the floating-point operation is also outputted to the other functional blocks.

(3.6) "Operand Address Calculation Unit"

The operand address calculation unit 115 is controlled in hardwired logic by information on operand address calculation outputted from the addressing mode decoder of the instruction decoding unit 112. In this operand address calculation unit 115, operand address calculation other than the memory access for the memory indirect addressing, and jump target address calculation of the jump instruction are executed.

The result of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 118. The values of the general-purpose register and the program counter required for address calculation are inputted from the integer operation unit 117 or the PC calculation unit 116.

(3.7) "PC Calculation Unit"

The PC calculation unit 116 is controlled in hardwired logic using information on PC calculation outputted from the instruction decoding unit 112. The PC calculation unit 116 calculates the PC value of an instruction. The data processor of the present invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

The result of calculation in the PC calculation unit 116 is outputted as the PC value of each instruction together with the result of decoding of the instruction.

In pre-branch processing at the instruction decoding stage, an address of branch destination instruction is calculated by adding a branch displacement outputted from the instruction decoding unit 11 and the PC value.

Also, the PC calculation unit 116 is provided with a PC stack for holding a copy of PC value, which is push to the stack at executing a jump-to-subroutine-instruction, of return destination from the subroutine. The PC calculation unit 116, for the return-from-subroutine-instruction, executes processing of generating an, address of pre-return destination by reading out the return destination PC value from the PC stack.

(3.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117. In the register file, a general register and a working register are included.

In the integer operation unit 117, a processor status word (PSW) including a flag which is varied by the result of integer operation and the bits which decide the external interruption mask level, and the buffer memory control register are included.

When an operand to be calculated by an instruction is an address or an immediate value, the immediate value or calculated address is inputted from the operand address calculation unit 115. Also, when an operand address to be calculated is data on the memory, its address calculated in the address calculation unit 115 is outputted to the operand access unit 120, and the data fetched from a built-in data cache or the outside is inputted to the integer operation unit 117.

In operation, in the case where the built-in data cache, external data caches 107, 108 or the main memory 109 must be read, the integer operation unit 117 outputs the address to the operand access unit 120 and fetches target data under the control of the microprogram.

When it is necessary to store the operation result in the data buffer, external data caches 107, 108 or the main memory 109, the integer operation unit 117 outputs the address and data to the operand access unit 120 under the control of the microprogram. At this time, from the PC calculation unit 116, the PC value of the instruction executing the storing operation is outputted to the operand access unit 120.

When external interruption and exception are processed and the integer operation unit, 117 receives the new instruction address, the integer operation unit 117 outputs the new instruction address to the instruction fetch unit 111 and the PC calculation unit 116.

(3.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118. Also, the floating-point operation unit is provided with a floating-point operation mode control register FMC which set a mode of the rounding method of flowing-point operation and detection allowance of floating-point operation exception.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the built-in data cache or the outside is inputted to the floating-point operation unit 118.

When it is necessary to store the operand in the built-in data cache, external data caches 107, 108 or the main memory 109, the floating-point operation unit 118 outputs data to the operand access unit 120 under the control of the microprogram. In storing operation, the floating-point operation unit 118 and the integer operation unit 117 operate in cooperation with each other to output the operand address from the integer operation unit 117, and the operand itself from the floating-point operation unit 118 to the operand access unit 120. At this time, from the PC calculation unit 116, the PC value of the instruction executing the storing operation is outputted to the operand access unit 120.

(3.10) "Operand Access Unit"

An operand access unit 120 includes the operand address translation mechanism, the data buffer, a data TLB, a store buffer and an operand breakpoint register and their control units. In addition, the data buffer operates as an built-in data cache or a memory for saving context by changing over the modes.

In the case where the data buffer is made to be operated as the built-in data cache, when loading data, the operand access unit 120 translates the logical address of data to be loaded outputted from the operand address calculation unit 115 or the integer operation unit 117 into the physical address, fetches data from the data buffer and outputs it to the integer operation unit 117 or the floating-point operation unit 118.

When a data cache miss occurs, the operand access unit 120 outputs the physical address to the address input/output unit 119, requests the data access to the outside and registers data inputted through the data input/output unit 121 in the data buffer.

When storing the data, the operand access unit 120 translates the logical address of data to be stored outputted from the integer operation unit 117 into the physical address, stores data outputted from the integer operation unit 117 or the floating-point operation unit 118 in the data buffer, outputs the physical address to the address input/output unit 119 through the store buffer and outputs the data to the outside through the data input/output unit 121. When a data cache miss occurs in the storing operation, data is not updated.

In the store buffer, data to be stored and its address, and more over, the PC value of the instruction executing the storing operation are managed in a set. The storing operation in the store buffer is managed in a first-in first-out (FIFO) manner.

Address translation by paging for the data TLB miss and the update of the data TLB are also performed by the control circuit in the operand access unit 120. It is also checked whether or not the memory access address is in an I/O rarea mapped in the memory.

When the data buffer is made to be operated as the built-in data cache, in the case where the data processor of the present invention is under a bus watching mode, the erand access unit 120 invalidates the entry of the data buffer hit by the physical address inputted through the address input/output unit 119.

(3.11) "Address Input/Output Unit"

The address input/output unit 119 outputs the address outputted from the instruction fetch unit 111 and the operand access unit 120 to the outside of the data processor 100 of the present invention. The address is outputted in accordances with a bus protocol defined in the data processor 100 of the present invention.

The bus protocol is controlled by an external bus control circuit in the address input/output unit 119. In the external bus control circuit, the page fault exceptions bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(3.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a standard access mode in which a 64-bit data is accessed for one address, and a quad accessing mode in which four 64-bit data are accessed continuously for one address, in either case, the data input/output unit 121 inputs and outputs the data between the operand access unit 120 and the external memory.

(4) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(4.1) "Pipeline Mechanism"

Figure 24:
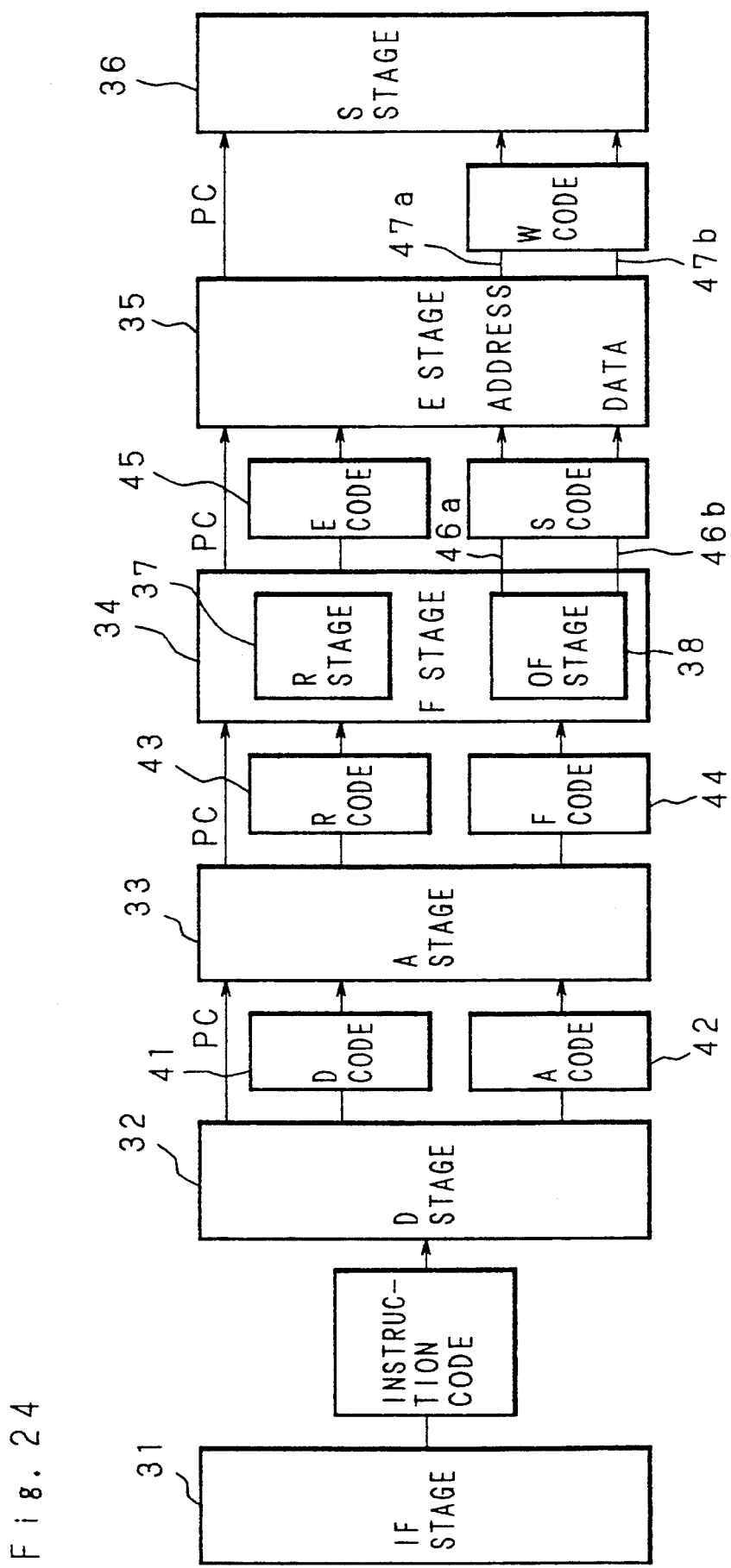
FIG. 24 is a schematic view for explaining a pipeline processing stage of a data processor of the present invention.

A pipeline processing mechanism of the data processor 100 of the present invention is constituted as shown schematically in FIG. 24.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an R stage 37) and the operand prefetch (particularly referred to as an OF stage 38), an execution stage (E stage) 35 for executing the instruction and a store stage (S stage) 36 which stores the memory operand. In addition, in the S stage 36, there is a 3-entry store buffer.

Each stage operates independently of the other stages and, theoretically, the six stages operate completely independently.

Each stage other than the S stage 36 performs one processing in one clock cycle at a minimum. The S stage 36 performs one operand storing in two clock cycle at a minimum. Thus, in the case where there is no memory operand storing, theoretically, the pipeline processing is proceeded in every clock cycle.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural pipeline processing units (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the microprogram routine and parameters to the microprogram, an F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and its address and the PC value of the instruction being processed. The S codes 46a, 46b comprise an address 46a and data 46b.

Information given to the S stage 36 from the E stage 35 are W codes 47a, 47b which are the operation results to be stored and the PC value of the instruction outputting the operation results. The W codes 47a, 47b comprise an address 47a and data 47b.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage. The EIT detected in the S stage 36 is received at the time point where execution of the instruction being processed in the E stage 35 is completed or at cancellation of the processing of the instruction, and restored to the E stage 35 for processing.

(4.2) "Processings in Each Pipeline Stage"

The input/output step codes to respective pipeline stages are named, as shown in FIG. 24, for the sake of convenience. In the step codes, there are two kinds, the one which becomes the entry address of microprogram and its parameters, and the other which becomes the operand to be processed in the E stage 35. Between the D stage 32 and the S stage 36, the PC value of the instruction being processed is received and given.

(4.2.1) "Instruction Fetch Stage"

In the instruction fetch stage (IF stage) 31, the instruction fetch unit 111 is operated. The instruction fetch unit 111 fetches the instruction from the built-in instruction cache or the outside and inputs it to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a standard access mode, it requires at least 2 clock cycles for the aligned 4 bytes.

Under a quad access mode, at least 5 clock cycles are necessary for 16 bytes.

When the built-in instruction cache is hit, fetch is possible in 1 clock cycle for the aligned 8 bytes.

Output unit of the instruction queue is variable by every 2 bytes, and can be outputted to 6 bytes in 1 clock at a maximum. Right after the jump, the instruction queue may be bypassed and the 2-byte instruction base part is transferred directly to the instruction decoder.

Translation of the logical address of the instruction into the physical address, control of the built-in instruction cache and instruction TLB, management of the prefetch of instructions, and control of the instruction queue are performed in the IF stage 31.

(4.2.2) "Instruction Decoding Stage"

The instruction decoding stage (D stage) 32 decodes the instruction code inputted from the IF stage 31. The instruction code is decoded once in one clock cycle using an FHW decoder, and NFHW decoder and an addressing mode decoder in the instruction decoding unit 112, and 0 to 6-byte instruction code is consumed in one decoding (the instruction code is not consumed in the output processing of the step code including the return destination address of the return-from-subroutine-instruction).

In one decoding, the D stage 32 outputs an A code 42 as address calculation information and a D code 41 as an intermediate decoding result of the operation code to the A stage 33.

In the D stage 32, control of the PC calculation unit 116 of each instruction and the output processing of the instruction code from the instruction queue are performed.

In the D stage 32, pre-jump processing is performed for the branch instruction or return-from-subroutine-instruction. For the unconditional branch instruction which made pre-jumping, the D code 41 and A code 42 are not outputted and the instruction processing is completed in the D stage 32.

(4.2.3) "Operand Address Calculation Stage"

Processing of an operand address calculation stage (A stage) 33 is roughly divided into two. First is the post-stage decoding processing of the operation code using the second decoder of the instruction decoding unit 112, and second one is the calculation processing of the operand address in the operand address calculation unit 54.

In the second-stage decoding processing of the operation code, the D code 41 is inputted and the R code 43 including the address of the write reservation of the register and memory, the entry address of microprogram routine, and parameters for the microprogram is outputted. Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44. For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the following ceding instruction is in the waiting state until the writing processing of the preceding instruction is completed in the E stage 35.

In the A stage 33, for the jump instruction which has not pre-jumped in the D stage 32, the pre-jump processing is performed. For a jump to the register indirect address, pre-jumping is performed in the A stage 33. For the unconditional jump instruction performing the pre-jumping, the R code 43 and F code 44 are not outputted and the instruction processing is completed in the A stage 33.

(4.2.4) "Micro ROM Access Stage"

Processing of an operand fetch stage (F stage) 34 is also divided roughly into two. First is the access processing of the micro ROM, particularly referred to as an R stage 37, and second one is the operand prefetch processing, particularly referred to as an OF stage 38. The R stage 37 and the OF stage 38 do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code 45, which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next R code 43 is in the waiting state of micro ROM access. Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(4.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, even if the operand crosses an 8-byte boundary, the operand fetch less than 8 bytes is fetched. In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

In the case where the operand to be prefetched and the operand to be written by the E stage 35 are coincided, the operand prefetch is not performed from the built-in data cache nor the external but through the by-path.

(4.2.6) "Execution Stage"

The execution stage (E stage) 35 operates with the E code 45 and the S codes 46a, 46b as inputs. The E stage 35 is the instruction executing stage, thus the processings performed in stages before and in the F stage 34 are all pre-processings for the E stage 35. When a jump is performed or the EIT processing is started in the E stage 35, the processings from the IF stage 31 to the F stage 34 are all repealed. The E stage 35 is controlled by the microprogram and executes the instruction by executing a series of instructions from the entry address of the microprogram routine specified in the E code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel. For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep. In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

In addition, during the tracing operation, a PC value of an executed instruction is always outputted from the E stage 35 to the S stage 36 with respect with no relation to the store operation of an operand.

(4.2.7) "Operand Store Stage"

The operand store stage 36 translates the logical address 47a of the W code into the physical address by data TLB, and stores the data 47b of the W code in the built-in data cache by above translated address. Simultaneously, the operand store stage 36 inputs the W codes 47a, 47b and the program counter value in the store buffer, and processes to store the data 47b of the W code to the external memory using the physical address outputted from the data TLB.

The operation of the operand store stage 36 is performed in the operand access unit 120, and also the address translation processing and the permuting processing of the data buffer, in the case where the data TLB or a data buffer miss occurred.

When the operand store stage 36 detects an EIT at the store processing of the operand, while holding the W codes 47a, 47b and the program counter value in the store buffer, the EIT is noticed to the E stage 35.

(4.3) "State control of Each Pipeline Stage"

Each pipeline stage includes an input latch and an output latch, and basically, operates independently of the other stages. Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the timing immediately before each of the stages starts the operation. In the case where the input signals are not ready, this stage becomes the waiting state (input waiting). When transferring from the output latch to the input latch of the next stage, the input latch of the next stage must be empty. Even in the case where the next stage input latch is not empty, the pipeline stage is in the waiting state (input waiting). When the cache or the TLB misses or data interference occurs between the instructions being processed in the pipeline, a plural number of clocks are necessitated for the processing of one stages results in delay of the pipeline processing.

(5) "Detailed Description on Operation of Data Operation Unit"

Figure 25:
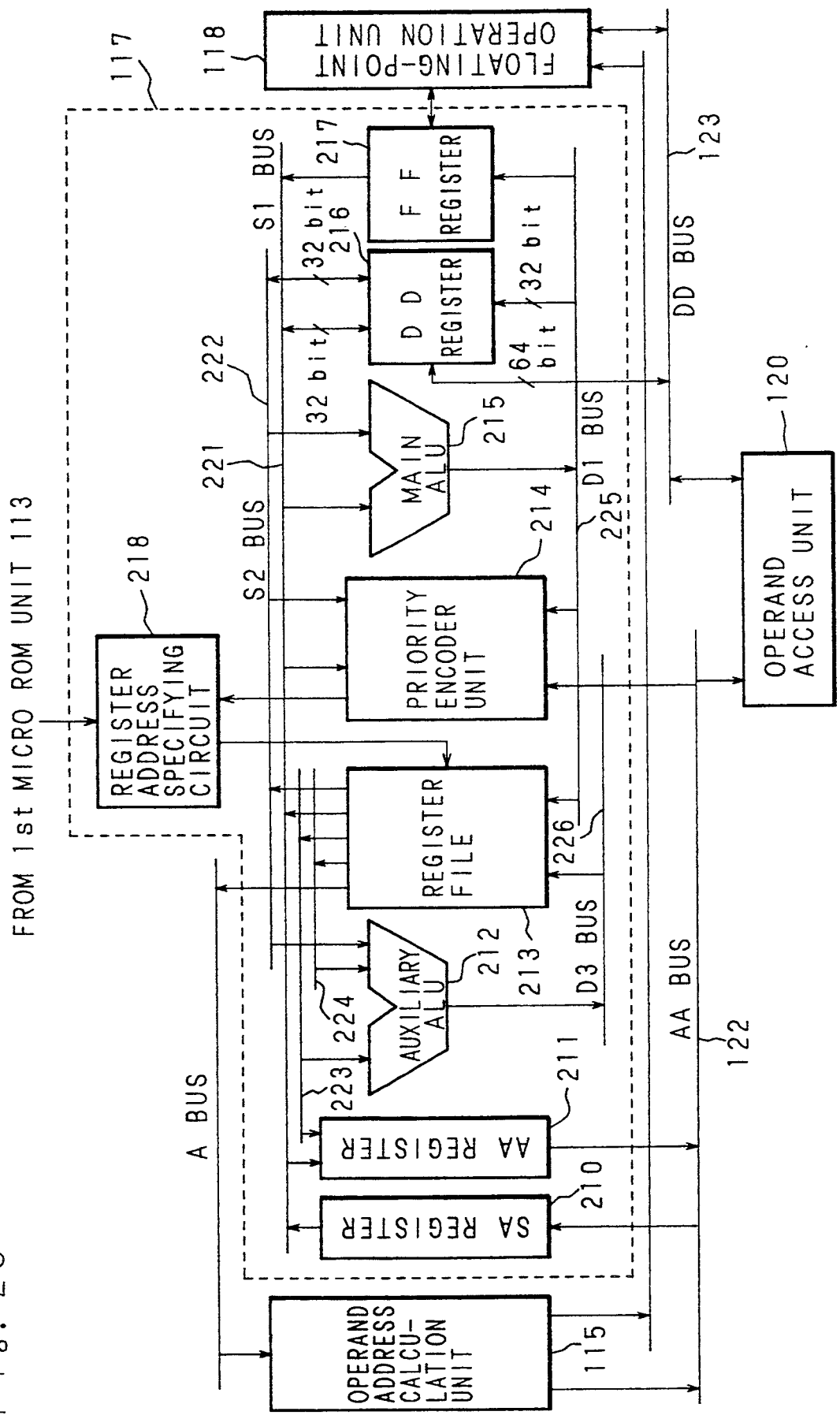
FIG. 25 is a block diagram showing a detailed configuration of an integer operation unit of a data processor of the present invention.

FIG. 25 is a detailed block diagram of an integer operation unit 117 of a data processor 100 of the present invention, in which also an operand address calculation unit 115, a floating point arithmetic unit 118 and an operand access unit 120 are shown.

An SA register 210 is a register which holds an operand address or an immediate data outputted to the integer operation unit 117 from the operand address calculation unit 115.

AA register 211 is a register which outputs the address to the operand access unit 120 from the integer operation unit 117, and has increment/decrement functions of 1, 2, 4 and 8 with respect to the holding contents. The function of incrementing and decrementing 8 is significant in the case where two 4-byte integers are transferred simultaneously between general purpose registers and memory, and in the case of transferring an 8-byte floating point between a floating point register and memory.

A register file 213 holds various data in the integer operation unit 117. The register file 213 is also connected respectively to a main ALU 215 and an auxiliary ALU 212 through three 4-byte buses, thereby allowing the main ALU 215 or the auxiliary ALU 212 to operate addition and comparison for the operands on the two registers.

ADD register 216 is an interface register for inputting and outputting data between the integer operation unit 117 and the operand access unit 120, and is connected to the operand access unit 120 by an 8-byte DD bus 123.

An FF register 217 is an interface register between the integer operation unit 117 and the floating point operation unit 118.

A priority encoder unit 214 searches a "1" or "0" bit in a bit string, or searches a field where two serial bits are "1" or "0", and output their position numbers.

A register address specifying circuit 218 controls reading and writing of data for the register file 213 according to a register address specified by the first microROM unit 113 or a register address specified by the priority encoder 214, according to the microinstruction outputted from the first micro-ROM 113.

In the following, detailed configurations of the priority encoder unit 214 and the register address specifying circuit 218, and operations of the LDM instruction and the STM instruction will be described.

(5.1) "Detailed Configuration of Priority Encoder Unit"

Figure 26:
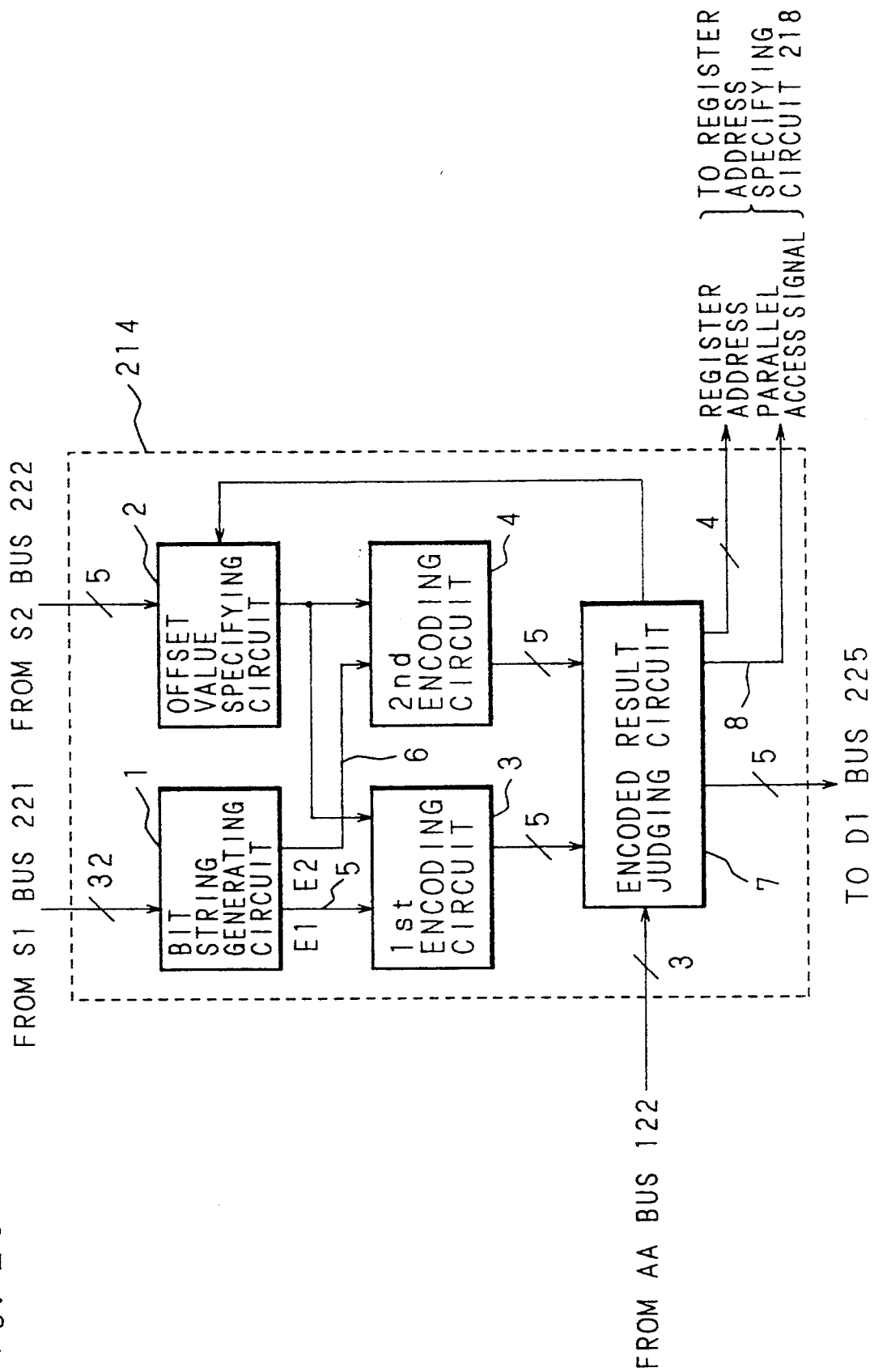
FIG. 26 is a block diagram showing a detailed configuration of a priority encoder unit of a data processor of the present invention.

FIG. 26 is a detailed block diagram of a priority encoder unit 214.

The priority encoder unit 214 is constituted by a bit string generating circuit 1, an offset value specifying circuit 2, two priority encoding circuits 3 and 4, an encoded result judging circuit 7, and so on.

The bit string generating circuit 1 includes, functions of holding 16-bit or 32-bit strings inputted from an S1 bus 221, inverting "0" and "1", reversing the bit order and executing AND operation between the adjacent bits, and outputs the bit string thus converted to the first encoding circuit 3 and the second encoding circuit 4.

Figure 27:
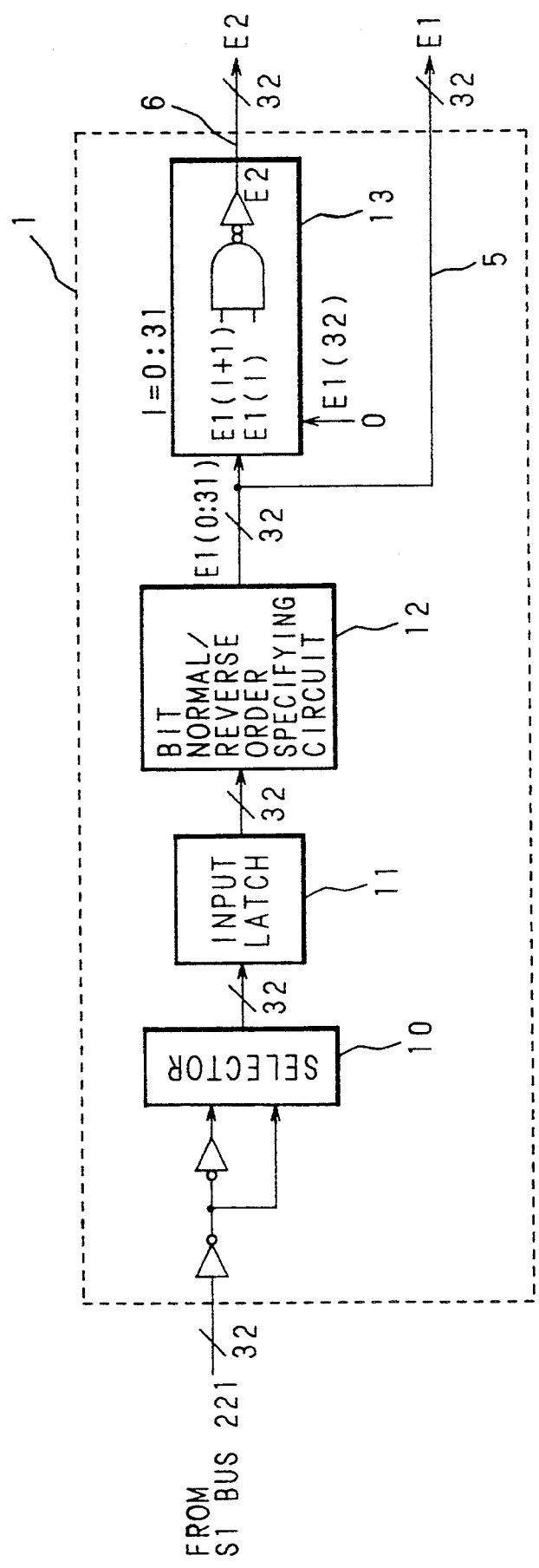
FIG. 27 is a block diagram showing a detailed configuration of a bit string generating circuit which is an element configuring the priority encode unit.

FIG. 27 is a block diagram showing a detailed configuration of the bit string generating circuit 1.

Values inputted from the S1 bus 221 are inputted to a selector 10 intact and also as a bit string inverted by an inverter. The selector 10 selects and outputs either of the bit string which is inverted or not inverted so as to be held in an input latch 11.

Output of the input latch 11 is inputted to the first encoding circuit 3, the bit order being reversed, if necessary, in a bit normal/reverse order specifying circuit 12. Output from the bit normal/reverse order specifying circuit 12 is also inputted to the second encoding circuit 4, each of the bits being executed AND operation with the respective adjacent higher order side bit by an AND circuit 13.

The offset value specifying circuit 2 holds the 5-bit offset value inputted from an S2 bus 222, and outputs the value to the first encoding circuit 3 and the second encoding circuit 4. The offset value specifying circuit 2 also has a function for inputting the offset value outputted from the encoded result judging circuit 7, and adding "1" or "2" to the value.

The first encoding circuit 3 and the second encoding circuit 4 are a priority encoding circuit having a same circuit configuration, or a combinational logical circuit which searches the first "1" in the bit string inputted from the bit string generating circuit 1 after the bit position specified by the offset specifying circuit 2, and outputs the bit position number of the first "1".

Making encoded values outputted from the first encoding circuit 3 and the second encoding circuit 4 and the least significant three bits of the AA bus 122 input, the encoded result judging circuit 7 outputs the encoded result and the value to be added to the offset value specifying circuit 2, and the register number and the parallel access signal 8 specifying whether the two registers should be accessed at the same time to the register address specifying circuit 218, and besides can output the encoded value outputted from the first encoding circuit 3 to D1 bus 225. The encoded result judging circuit 7 also can output the ones compliment value of each bit of the output of the first encoding circuit 3 to the register address specifying circuit 218.

The parallel access signal 8 is asserted when all of the least significant three bits of the AA bus 122 are "0" and the encoded results of the first encoding circuit 3 and the second encoding circuit 4 are equal.

(5.2) "Register Address Specifying Circuit"

Figure 28:
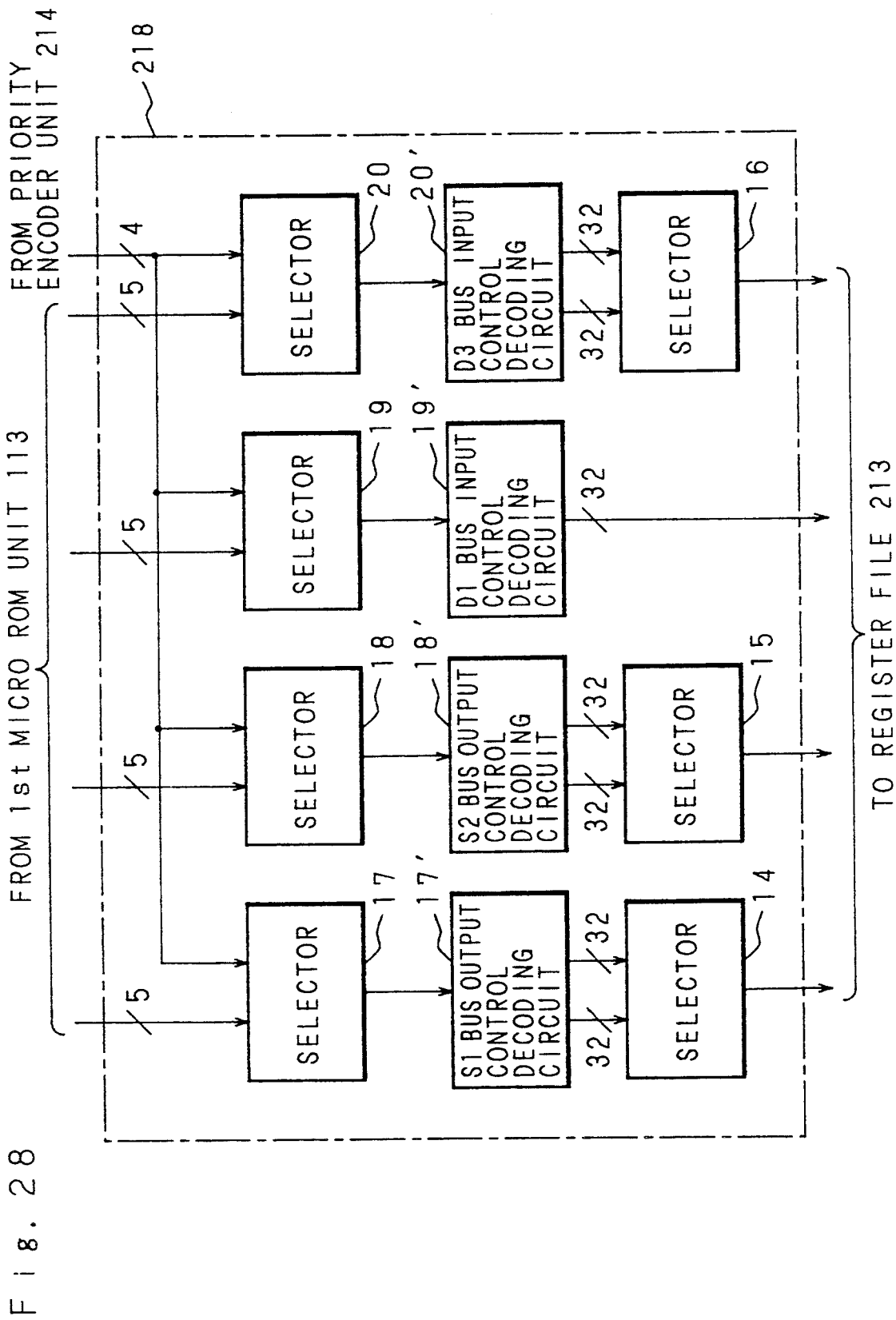
FIG. 28 is a block diagram showing a detailed configuration of a register address specifying circuit.

FIG. 28 is a block diagram showing a detailed configuration of a register address specifying circuit 218.

The register address specifying circuit 218 decodes a register address specified by the first micro-ROM unit 113 and a register number specified by the priority encoder unit 214, and controls input/output between the register file 213 and the S1 bus 221, S2 bus 222, D1 bus 225, and D3 bus 226.

From the first micro-ROM unit 113, it is possible to access the general purpose register and the working register, and the register which is inputted or outputted is specified in five bits address for each bus. From the priority encoder unit 214, the general purpose register which executes the input or output in the register file 213 is specified in 4 bits address, and at the input stage to selectors (17, 18, 19 and 20) of the register address specifying circuit 218, "0" is extended in the higher order bit to obtain the register address.

Either of the register addresses specified for each bus by the first micro-ROM unit 113 and the register number specified in the priority encoder unit 214 is selected by the selectors 17, 18, 19 and 20 and inputted to decoding circuits 17', 18', 19', and 20', respectively.

In the data processor 100 of the present invention, since registers which input and output to each of the buses are controlled according to the register address outputted from the first micro-ROM unit 113 for simple instructions such as a move instruction or an add instruction, the register address is decoded in the decoding circuits 17', 18', 19' and 20' for each of the buses, and the register file 216 is accessed according to the output signal thereof, but for some of the multi-functional instructions, by shifting the control signal outputted from the decoding circuits 17', 18'19' and 20', the register file 213 is accessed by the decoded result different from the original decoded result.

In the case where the two registers are accessed in parallel in executing the multi-functional instructions, in the case of the S2 bus 222 and D3 bus 226, the decoded result is shifted to one bit higher order side, in order to access the register having one number larger than the register number specified by the priority encoder unit 215. This function is realized by that the selectors 15, 16 select control signal wire group through which the bit string of the decoded result is shifted to one bit higher order side, and do not select the control signal wire group through which the bit string of the decoded result itself is outputted.

In the case where the two registers are accessed in parallel in executing the multi-functional instructions, which use the S1 bus 221, the decoded result of the decoder 17' is shifted to one bit lower order side, in order to access the register having one number smaller than the register number specified by the priority encoder unit 214. This function is realized by that selector 14 selects control signal wire group through which the bit string of the decoded result is shifted to one bit lower side and does not select the control signal wire group through which a bit string of the decoded result itself is outputted.

(5.3) "Operation of LDM Instruction"

Figure 30E:
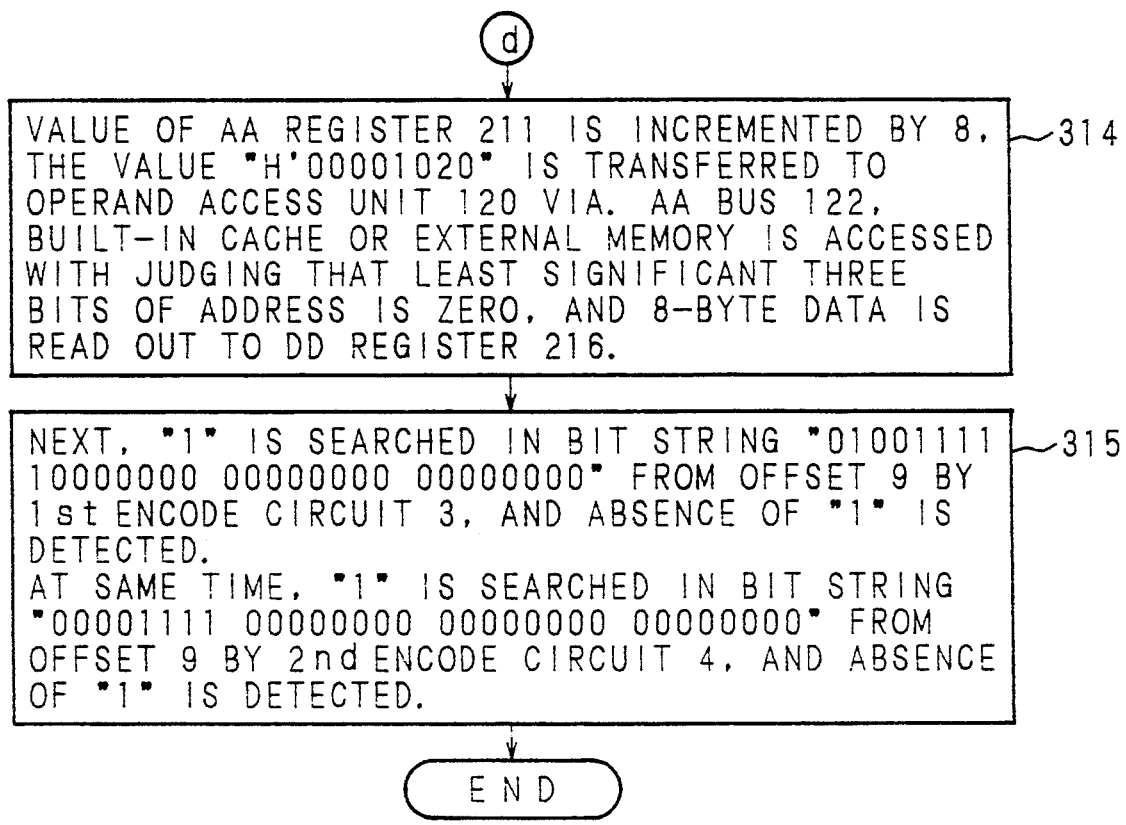

FIG. 29 is a schematic view showing an example code of the LDM instruction, and FIG. 30(a through e) is a flow chart showing operating procedures of a integer operation unit 117 when the LDM instruction is executed.

The LDM instruction is the instruction to load six 4-byte data from a stack area to the general purpose registers R1, R4, R5, R6, R7 and R8. In the case where the LDM instruction is executed by the data processor 100 of the present invention, the integer operation unit 117 operates according to the flow chart shown in FIG. 30(a through e) under the control of the first micro-ROM unit 113.

In blocks 301 and 302 of this example, a register list "01001111 10000000" is converted in the bit string generating circuit 1. In block 303, the bit string encoded by the first. encoding circuit 3 becomes "01001111 10000000 00000000 00000000", and the bit string encoded by the second encoding circuit 4 becomes "00001111 00000000 00000000 00000000". Through the two encoded results are coincided at register numbers "4, 5, 6, 7" when these bit strings are encoded, since the least significant three bits of the AA bus 122 are not "0" in the case where of the register number "4", data are loaded to the registers R1 (as shown in block 304) and R4 (as shown in blocks 305 to 307) in 4 bytes per one operation, and to the registers R5 and R6, R7 and R8, the data are loaded respectively in parallel (as shown in blocks 308 to 315).

In the case where the registers R5 and R6, R7 and R8 are accessed simultaneously, and as shown in blocks 309 and 312, a parallel access signal 8 outputted from the encoded result judging circuit 7 is asserted In blocks 310 and 313, the selector 16 selects the control signal wire group through which the bit string of the decoded result is shifted to one bit higher order side according to the parallel access signal 8, and the value is loaded to the register whose number is one larger than the number outputted from the encoded result judging circuit 7.

(5.4) "Operation of STM Instruction"

In the case where the STM instruction whose destination addressing mode is other than the @-SP mode is executed, the operation of the priority encoder unit 214 is same as the case of LDM instruction, since the same format register list as the LDM instruction is processed. Also, in the register address specifying circuit 218, the register whose number is one larger than the encoded register number is accessed. The selector 15 selects a control signal wire group through which the bit string of the decoded result is shifted to one bit higher order side.

In the case where the STM instruction whose destination addressing mode is a @-SP mode is executed, the format of the register list is different from that of the LDM instruction, and the operation of the priority encoder unit 214 partly differs. In this case, the value outputted from the first encoding circuit 3 is transferred intact to the offset value specifying circuit 2 from the encoded result judging circuit 7, and the value inverted "0" and "1" of the value outputted from the first encoding circuit 3 is outputted to the register address specifying circuit 218. The searched and encoded bit number itself is transferred to the offset value specifying circuit 2, and the register number corresponding to the bit number is outputted to the register address specifying circuit 218. In this case, in the register address specifying circuit 218, when the parallel access signal 8 is asserted, a value is outputted to the S2 bus 222 from the register whose register number is the inputted register number itself, and to the S1 bus 221 a value is outputted from the register whose number is one smaller than the inputted register number. This function is realized by that selector 14 selects a control signal wire group through which the bit string of the decoded result is shifted to one bit lower order side.

For example, in the STM instruction shown in FIG. 31, a bit string to be encoded by the first encoding circuit 3 is "00000001 11110010 00000000 00000000", and a bit string to be encoded by the second encoding circuit 4 is "00000001 11100000 00000000 00000000". In the first encoding operation, to the encoded result judging circuit 7, the value "7" is inputted from both the first encoding circuit 3 and the second encoding circuit 4, and from the AA bus 122, the least significant three bits of an address "H' 00001FF8", three "0", are inputted. In response to these inputs, the encoded result judging circuit 7 outputs the value "7" and the add value "2" to the offset specifying circuit 2, and outputs the register number "8" corresponding to "1000" which is the inverted value of "0111" which is the binary representation of "7" to the register address specifying circuit 218, and asserts the parallel access signal 8.

In the register address specifying circuit 218, the inputted register number "8" is decoded, to the S2 bus 222 data are read out from the register R8 and to the S1 bus 221 data are read out from the register R7, by selecting a control signal wire group through which the decoded result is shifted to one bit lower order side. Two data read out to the S1 bus 221 and the S2 bus 222 are concatenated by the DD register 216 and one 8-byte data is transferred to the operand access unit 120 via the DD bus 123, and is stored in an internal data cache or an external memory.

(6) "External Access Operation"

(6.1) "Input/Output Signal Line"

Figure 32:
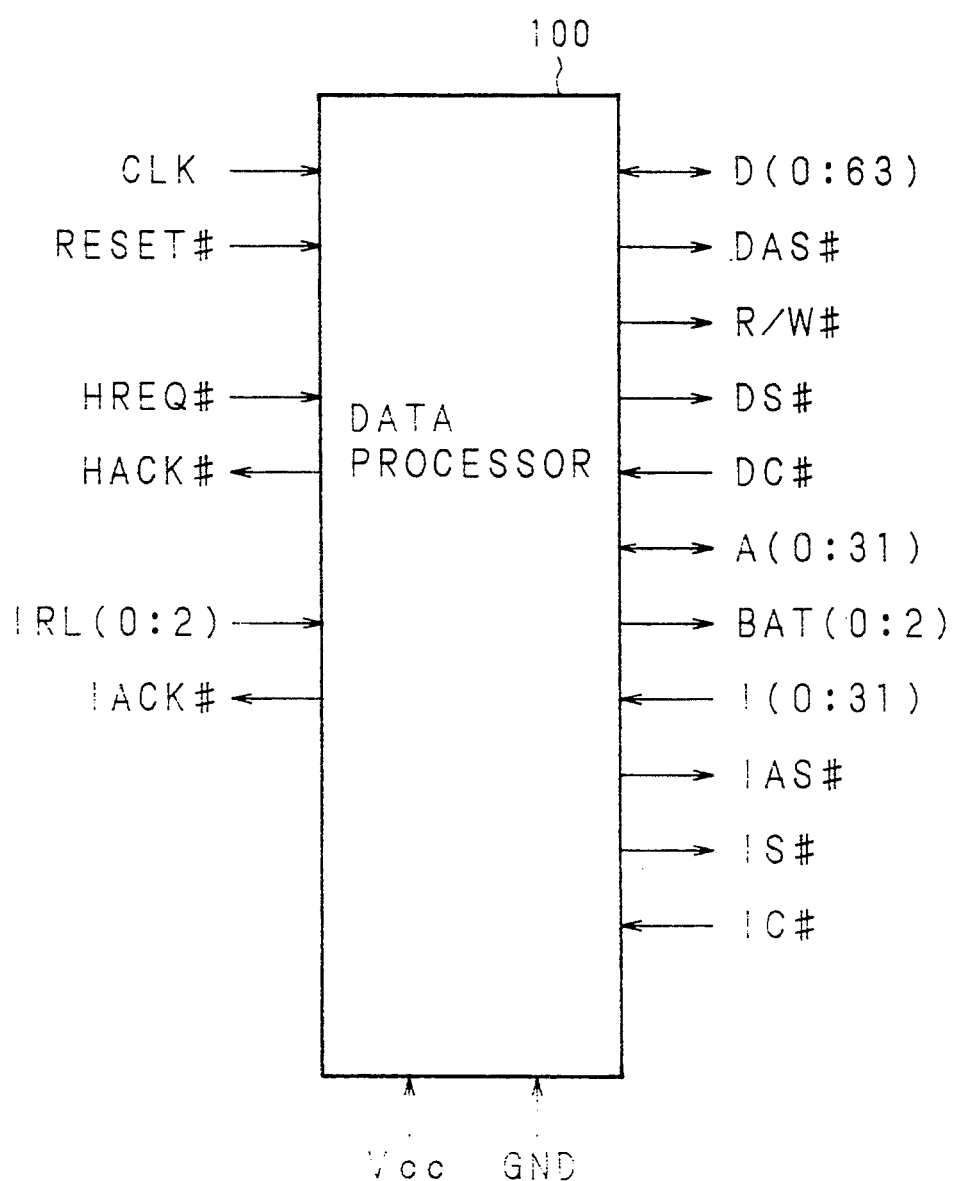
FIG. 32 is a schematic view showing input/output pins of a data processor of the present invention.

FIG. 32 is a schematic view showing the input/output signals of the data processor 100 of the present invention.

To and from the data processor 100 of the present invention, besides a power source Vcc and ground GND, 64 data pins, 32 address pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a low active signal) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 32.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus to the data processor 100 of the present invention.

HACK# is a signal which indicates that the data processor 100 of the present invention has accepted the hold request HREQ# and given the bus to the other device.

IRL(0:2) is an external interruption request signal.

IACK# is a signal which indicates that the data processor 100 of the present invention has accepted the external interruption and performing an interruption vector access cycle.

(6.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins. The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a standard access mode, the data access using the data bus 102 and the instruction access using the instruction bus 103 are performed respectively for the external memory having a sufficient high speed, at the speed of once in two cycles of the external input clock CLK.

At the time of bus access in a burst access mode, the data access using the data bus 102 and the instruction access using the instruction bus 102 are performed respectively for the external memory having a sufficient high speed, at the speed of four times in five cycles of the external input clock CLK.

The address bus 101 is utilized for accessing both the data caches 107, 108 and the instruction cache 106.

(7) "Other Embodiments of the Present Invention"

In the embodiment stated above, though an example of register address specifying circuit through which the register whose address adjacent to the inputted register address is accessed by shifting the decoded result of the inputted register address to one bit is explained, a register address specifying circuit through which the register whose address spaced several addresses from the inputted register address is accessed by shifting the decoded result to plural bits may be constructed similarly.

It is also possible to realize the register address specifying circuit which accesses two or more kinds of address register different from the inputted register address, by transferring a bit string resulted from decoding the inputted register address and a bit string shifted to several bits therefrom by two or more control wire groups and selecting by a selector, by providing the selector with multiple inputs.

In the embodiment stated above, though an example of instruction, in which the register corresponding to the bit of "1" in the register list is the register to be operated, has been described, even the instruction, in which the register corresponding to the bit of "0" in the register list is the register to be operated, can be processed similarly by inputting the bit string to be searching to the priority encoder in reverse.

Also, in the aforesaid embodiment, though examples of the LMD instruction and the STM instruction have been described as the plural data transferring instruction, as far as the instruction specifies the register to be transferred by using the register list as such as the instruction for saving data in the plural register and forming a stack frame at entering the procedures, or the instruction for restoring data to the plural registers and releasing the stack frame at the end of the procedures, the same processing as the aforesaid embodiment is possible.

As particularly described heretofore, since the register address specifying circuit of the present invention includes a decoder for decoding the register address represented in a binary digit into a first bit string, and a selector which is connected to the decoder and selectively outputs either the first bit string which is the decoded result or a second bit string obtained by shifting the first bit string to one bit, and responsive to the selective result of the selector, accesses a register whose address is n or accesses a register whose address is either $n+1$ on $n-1$, so that the register whose address is the same as the inputted address and the register whose address is adjacent thereto are both accessed at high speed.

In the first invention of the data processor comprising the register address specifying circuit of the present invention, there are provided instruction decoding means for decoding instructions and instruction executing means which includes: a data register holding a 2n-bit data; a first register of a first register address holding an n-bit data; a second register of a second register address holding an n-bit data; a first bus for transferring a first n-bit data to the data register from the first register; a second bus for transferring a second n-bit data to the data register from the second register; a first decoder for decoding an address of a register to be connected to the first bus and the register address specifying circuit for decoding the an address of a register to be connected to the second bus; and which executes the instruction according to the output signal of the instruction decoding means, and in the case where a basic operation instruction (first instruction) is decoded by an instruction decoding mechanism, the register address specifying circuit accesses the second register according to the second register address and transfers an n-bit data to the data register from the second registers and in the case where a multi-data transferring instruction (second instruction) is decoded by the instruction decoding means, by decoding the first register address by the first decoder to access the first register, the first n-bit data is transferred to the data register from the first register, and according to the first register address, the register address specifying circuit accesses the second register to transfer the n-bit second data to the data register from the second register, thereby the first and second data are coupled. Therefore, when saving the contents of plural registers including the plural registers having the serial register numbers to a memory, the contents of two registers having the serial register numbers are accessed at the same time, so that it is possible to transfer two data in parallel. Accordingly, since data to be saved at entering a procedure are often allocated to the registers of serial numbers in a compiler, the data processor of the present invention is able to save the data in the memory from the register up to twice as fast as compared with the conventional data processor.

In the second invention of the data processor comprising the register address specifying circuit of the present invention, there are provided instruction decoding means for decoding instructions and instruction executing means includes: a data register holding a 2n-bit data; a first register of a first register address holding an n-bit data; a second register of a second register address holding an n-bit data; a first bus for transferring a first n-bit data to the first register from the data register; a second bus for transferring the remaining an n-bit data as the second data to the second register from the data register; a first decoder for decoding an address of a register to be connected to the first bus and the register address specifying circuit for decoding an address of a register to be connected to the second bus; and which executes the instruction according to the output signal of the instruction decoding means, and in the case where a basic operation instruction (first instruction) is decoded by the instruction decoding means, the register address specifying circuit accesses the second register according to the second register address and transfers an n-bit data to the second register from the data register, and in the case where a plural data transferring instruction (second instruction) is decoded by the instruction decoding means, by decoding the first register address by the first decoder to access the first register, the first n-bit data is transferred to the first register from the data register, and according to the first register address, the register address specifying circuit accesses the second register to transfer the second n-bit data to the second register from the data register. Therefore, in the case where, for example, data are transferred to plural registers including the plural registers having the serial register numbers from the memory, two data to be transferred to the two registers having the serial register numbers are fetched together from the memory and the two data can be transferred to the register in parallel. Accordingly, since data are often restored to the serial registers when exiting a procedure in a compiler, the data processor of the present invention is able to restore the data to the register from the memory up to twice as fast as compared with the conventional data processor.

What is claimed is:

1. A register address specifying circuit for allowing a data processor to simultaneously access first and second registers in a register file which is addressable by bit strings, said register address specifying circuit comprising:

a decoding control circuit for decoding a binary address N of the first register into a first bit string, which addresses the first register in the register file, and for shifting said first bit string M bits to obtain a second bit string, which addresses the second register in the register file; and a selector circuit, coupled to said decoding control circuit, to which said first bit string and said second bit string are input, for selectively outputting said first bit string to access the first register having said address N and said second bit string to access the second register having an address either N+M or N−M.

2. A register address specifying circuit as set forth in claim 1 wherein said selector circuit inputs a parallel access signal and comprises a first selector switch and a second selector switch and wherein in response to said parallel access signal said first selector switch outputs the first bit string to access the first register and said second selector switch outputs the second bit string to access the second register.

3. A register address specifying circuit as set forth in claim 2 wherein a first data word is transferred between the register file and a memory when the first register is accessed by said register address specifying circuit and wherein a second data word is transferred between the register and said memory when the second register is accessed by said register address specifying circuit.

4. A data processor that allows first and second data words to be simultaneously transferred between first and second registers of a register file and a memory in response to a macroinstruction that transfers a plurality of data words between the memory and the register file, said data processor comprising:

instruction decoding means for decoding, from said macroinstruction, a first microinstruction and a second microinstruction; and instruction executing means, including:
a data register for holding the first and second data words;
a first bus for transferring the first data word to said data register from the first register;
a second bus for transferring the second data word to said data register from the second register;
a register address specifying circuit having a decoding control circuit for decoding a binary address N of a register into a first bit string and for shifting said first bit string M bits to obtain a second bit string, and a selector, coupled to said decoding control circuit, to which said first bit string and said second bit string are input, for selectively outputting said first bit string to access a register having an address N and said second bit string to access a register having an address either N+M or N−M;

said instruction executing means for executing said first microinstruction so that said register address specifying circuit accesses the first register according to said first bit string to transfer the first data word from the first register to said data register and for executing said second microinstruction so that said register address specifying circuit accesses the first register according to said first bit string to transfer said first data word to said data register from the first register, and simultaneous to accessing the first register, accesses the second register according to said second bit string to transfer said second data word to said data register from the second register, thereby joining the first data word and the second data word for transfer to the memory.

5. A data processor as set forth in claim 4, wherein said data words are 32 bits (four bytes).

6. A data processor that allows first and second data words to be simultaneously transferred between first and second registers of a register file and a memory in response to a macroinstruction that transfers a plurality of data words between the memory and the register file, said data processor comprising:

instruction decoding means for decoding, from said macroinstruction, a first microinstruction and a second microinstruction; and instruction executing means, including:
a data register for holding the first and second data words transferred from the memory;
a first bus for transferring the first data word to the first register from said data register;
a second bus for transferring the second data word to the second register from said data register;
a register address specifying circuit having a decoding control circuit for decoding a binary address N of a register into a first bit string and for shifting said first bit string M bits to obtain a second bit string, and a selector, coupled to said decoding control circuit, to which said first bit string and said second bit string are input, for selectively outputting said first bit string to access a register having an address N and said second bit string to access a register having an address either N+M or N−M;

said instruction executing means for executing said first microinstruction so that said register address specifying circuit accesses the first register according to said first bit string to transfer the first data word from said data register to the first register and for executing said second microinstruction so that said register address specifying circuit accesses the first register according to said first bit string to transfer said first data word from said data register to the first register, and simultaneous to accessing the first register, accesses the second register according to said second bit string to transfer said second data word from said data register to the second register.

7. A data processor as set forth in claim 6, wherein said data words are 32 bits (four bytes).

* * * * *